US009140967B2

(12) United States Patent
Aoki et al.

(10) Patent No.: US 9,140,967 B2
(45) Date of Patent: Sep. 22, 2015

(54) PROJECTION SYSTEM, PROJECTION-TYPE IMAGE DISPLAY DEVICE, AND MULTI-PROJECTION SYSTEM

(75) Inventors: Kazuhiko Aoki, Tokyo (JP); Masahiko Ohta, Tokyo (JP); So Nishimura, Tokyo (JP); Yoshiho Yanagita, Tokyo (JP); Osamu Ishibashi, Tokyo (JP); Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/001,860

(22) PCT Filed: Mar. 2, 2012

(86) PCT No.: PCT/JP2012/055383
§ 371 (c)(1),
(2), (4) Date: Aug. 27, 2013

(87) PCT Pub. No.: WO2012/118181
PCT Pub. Date: Sep. 7, 2012

(65) Prior Publication Data
US 2013/0335641 A1 Dec. 19, 2013

(30) Foreign Application Priority Data

Mar. 3, 2011 (JP) .................................. 2011-046727
Sep. 27, 2011 (JP) .................................. 2011-211615

(51) Int. Cl.
*G03B 21/14* (2006.01)
*G09G 3/02* (2006.01)
*H04N 9/31* (2006.01)
(Continued)

(52) U.S. Cl.
CPC ................ *G03B 21/14* (2013.01); *G03B 21/56* (2013.01); *G03B 21/60* (2013.01); *G09G 3/02* (2013.01); *H04N 9/3129* (2013.01); *G03B 2206/00* (2013.01)

(58) Field of Classification Search
CPC ............. G03B 21/60; G09G 3/02; H04N 9/31
USPC ................ 359/443, 449; 353/29, 122; 345/84
See application file for complete search history.

(56) References Cited

U.S. PATENT DOCUMENTS 7,878,657 B2    2/2011   Hajjar
7,884,816 B2    2/2011   Hajjar et al.
8,556,430 B2 *  10/2013  Hajjar et al. .................... 353/29
(Continued)

FOREIGN PATENT DOCUMENTS

JP    54-089525 A    7/1979
JP    02-221995 A    9/1990
(Continued)

OTHER PUBLICATIONS

International Search Report dated Jun. 5, 2012 in PCT/JP2012/055383, with English translation thereof.

*Primary Examiner* — Christ Mahoney
(74) *Attorney, Agent, or Firm* — McGinn IP Law Group, PLLC

(57) ABSTRACT

A projection screen includes: phosphor regions arranged cyclically in an in-plane direction of a display region; a plurality of black stripes and reference black stripes that partition the display region into the phosphor regions; and an optical information formation unit that is provided in a specific position within the display region and that generates readable optical information.

57 Claims, 13 Drawing Sheets

(51) Int. Cl.
*G03B 21/60* (2014.01)
*G03B 21/56* (2006.01)

(56) References Cited

U.S. PATENT DOCUMENTS

| | | | |
|---|---|---|---|
| 2003/0106994 A1* | 6/2003 | Sage | 250/271 |
| 2006/0227087 A1 | 10/2006 | Hajjar et al. | |
| 2007/0139766 A1* | 6/2007 | Radcliffe et al. | 359/459 |
| 2007/0187616 A1* | 8/2007 | Burroughs et al. | 250/458.1 |
| 2007/0188417 A1 | 8/2007 | Hajjar et al. | |
| 2009/0001272 A1 | 1/2009 | Hajjar | |

FOREIGN PATENT DOCUMENTS

| | | |
|---|---|---|
| JP | 2008-170674 A | 7/2008 |
| JP | 2008-538145 A | 10/2008 |
| JP | 2009-535654 A | 10/2009 |
| JP | 2009-537868 A | 10/2009 |
| JP | 2009-539120 A | 11/2009 |
| JP | 2010-533307 A | 10/2010 |
| WO | WO 2006/107720 A1 | 10/2006 |
| WO | WO 2007/050662 A2 | 5/2007 |
| WO | WO 2007/095329 A2 | 8/2007 |
| WO | WO 2007/134329 A2 | 11/2007 |
| WO | WO 2009/003192 A1 | 12/2008 |
| WO | WO 2010/116836 A1 | 10/2010 |

* cited by examiner

PROJECTION SYSTEM, PROJECTION-TYPE IMAGE DISPLAY DEVICE, AND MULTI-PROJECTION SYSTEM

TECHNICAL FIELD

The present invention relates to a projection screen and a projection-type image display device, and more particularly to a projection screen and projection-type image display device that is applied to a multi-projection system.

BACKGROUND ART

Patent Document 1 discloses a projection-type image display device in which excitation light is scanned to display an image on a fluorescent screen.

The projection-type display device that is disclosed in Patent Document 1 includes a fluorescent screen, a laser module, an optical detection unit, and a feedback adjustment means.

The fluorescent screen includes: a plurality of phosphor stripes formed at a fixed spacing in the in-plane direction; and reference marks that indicate the starting positions of the phosphor stripes and that are arranged on the outside of regions in which these phosphor stripes are provided.

A laser module scans a fluorescent screen with laser beam (excitation light). The optical detection unit detects the laser beam that is reflected by the reference marks. The output signal (detection signal of reference marks) of the optical detection unit is supplied to the feedback adjustment means as a feedback signal.

The feedback adjustment means acquires the timing of irradiation of the laser beam upon reference marks based on the detection signal of the reference marks from the optical detection unit, and based on the acquired irradiation timing, adjusts the light-emission timing of the laser module.

In the above-described projection-type display device, an image is displayed by scanning a fluorescent screen in a direction orthogonal to the phosphor stripes by a laser beam (optical pulse) that is modulated based on a modulation signal to excite the phosphors of each phosphor stripe.

The feedback adjustment means controls the light emission timing of the laser module based on the detection signals of reference marks from the optical detection unit such that the laser beam irradiates the phosphor stripes at the appropriate timing.

Patent Document 2 discloses a fluorescent screen that is used in a projection-type display device.

The fluorescent screen disclosed in Patent Document 2 includes a plurality of phosphor stripes that are formed at a fixed spacing in the in-plane direction and a plurality of stripe dividers that are formed between the phosphor stripes. Each of the plurality of stripe dividers is formed by a diffusive or optically reflective material and reflects a portion of the incident light.

In the projection-type display device that is equipped with the above-described fluorescent screen, an excitation beam is scanned in a direction that crosses the phosphor stripes on the fluorescent screen. Each stripe divider reflects a portion of the incident excitation beam. This reflected light is detected by a photodetector that is provided at a position that faces the scan surface of the fluorescent screen.

The timing of irradiation of each stripe divider by the excitation beam in horizontal scanning is acquired based on the output signal of the photodetector, and by determining the relative positions of the excitation beam with respect to the phosphor stripe based on this irradiation timing, the excitation beam can be irradiated upon the phosphor stripes at the appropriate timing. In this case, each stripe divider functions as a servo-mark for appropriately maintaining the relative position of the excitation beam with respect to the phosphor stripes.

Each stripe divider may be formed by a phosphor material that emits infrared fluorescent light or a phosphor material that emits other light (visible light) for which wavelength differs from that of the visible light (fluorescent light) that is emitted by the phosphor stripes. In this case, a filter that transmits only the fluorescent light (infrared light or other light) from the stripe divider is provided on the light-receiving surface of the photodetector.

Recently, a multi-projection system was provided in which a plurality of the devices disclosed in Patent Document 1 or Patent Document 2 are used as projectors to display images on a fluorescent screen by each scanning with excitation light, and then joining together the images that are displayed by each projector to form a single image.

In order to seamlessly join together the displayed images of each projector in a multi-projection system, the range that each projector displays on the fluorescent screen must be accurately prescribed.

The accurate installation of the fluorescent screens and each of the projectors in alignment with the above-described prescribed display ranges calls for high mounting precision. Achieving high installation precision calls for advanced techniques and places a heavy burden upon workers in the mounting operation.

In addition, in an image display device that displays an image by scanning a fluorescent screen with excitation light, the relative positional relation between the scanning system and fluorescent screen typically undergoes change due to various causes such as the replacement or installation of the fluorescent screen, vibrations or distortion, changes in the environment such as in temperature or humidity, the effect of gravity, or changes that occur with the passage of time. Thus, in order to maintain a state in which the displayed images of each projector are seamlessly joined in a multi-projection system, it is desired that each projector periodically or at arbitrary timings identify the display range of the image that the projector displays and adjust this specified display range to match the above-described prescribed display range.

LITERATURE OF THE PRIOR ART

Patent Documents

Patent Document 1: Japanese Unexamined Patent Application Publication (Translation of PCT Application) No. 2009-539120

Patent Document 2: Japanese Unexamined Patent Application Publication (Translation of PCT Application) No. 2009-537868

DISCLOSURE OF THE INVENTION

In a multi-projection system in which each projector is made up of the device disclosed in Patent Document 1, although it is possible for each projector to identify the display range of the image that it displays, problems are encountered as described below.

FIG. 1 gives a schematic representation of an image that is displayed on a fluorescent screen by each projector.

In the example shown in FIG. 1, six projectors are used. Each of the projectors displays images 101 on fluorescent screen 100. Reference marks 102 are provided at the peripheries of each of images 101.

Each projector is able to identify the display range of image 101 that it displays by detecting reference marks 102. As a result, overlapping of portions of the images that the projectors display can be prevented between adjacent projectors.

However, the display quality is substantially degraded because the regions in which reference marks 102 are provided are perceived as seams of the images.

In a multi-projection system in which each projector is made up of the device disclosed in Patent Document 2, each projector is unable to identify the display range of the image that it displays. As a result, when the relative positional relation between the scanning system and the fluorescent screen changes due to the previously described causes (installation and replacement of the fluorescent screen, vibrations or distortion, environmental changes such as temperature and humidity, the effect of gravity, and changes with the passage of time), maintaining the state in which the displayed images of each projector are seamlessly joined together becomes problematic.

In addition, high precision is demanded in mounting the projectors and fluorescent screen, placing a great burden on workers in the installation operation.

It is an object of the present invention to provide a projection screen and projection-type image display device that, when applied to a multi-projection system, can reduce the burden placed upon workers in the installation operation and that enables display in which images are each seamlessly joined together.

It is another object of the present invention to provide a multi-projection system that uses this projection-type image display device.

According to one aspect of the present invention for achieving the above-described objects, a projection screen is provided that includes:

a plurality of diffusion regions that are arranged cyclically in the in-plane direction of the display region and that each receive light and emit diffused light; and an optical information formation unit that is provided at a specific position within the display region and that forms readable optical information.

According to another aspect of the present invention, a projection-type image display device is provided that includes:

a projection screen;

an excitation light source;

scanning means that scans the projection screen with an optical beam from the excitation light source;

optical detection means that is arranged to face the surface on which scanning of the projection screen is carried out; and control means that both controls the scanning means and controls the light emission timing of the excitation light source to cause display of images on the projection screen;

wherein:

the projection screen includes:

a plurality of diffusion regions that are arranged cyclically in the in-plane direction of the display region and that each receive light and emit diffused light; and an optical information formation unit that is provided at a specific position within the display region and that forms readable optical information;

wherein the optical detection means supplies signals that accord with the pattern of light that is formed by the optical information formation unit when the projection screen is being scanned by the optical beam; and the control means acquires the specific position on the projection screen based on output signals of the optical detection means, identifies the display region on the projection screen based on the specific position that was acquired, and causes display of the image in the specified display region.

According to yet another aspect of the present invention, a multi-projection system is provided that includes:

a plurality of projector units that are made up of the above-described projection-type image display device; and a main control unit that causes each of the plurality of projector units to display images based on input video signals.

EXPLANATION OF REFERENCE NUMBERS

Figure 1:
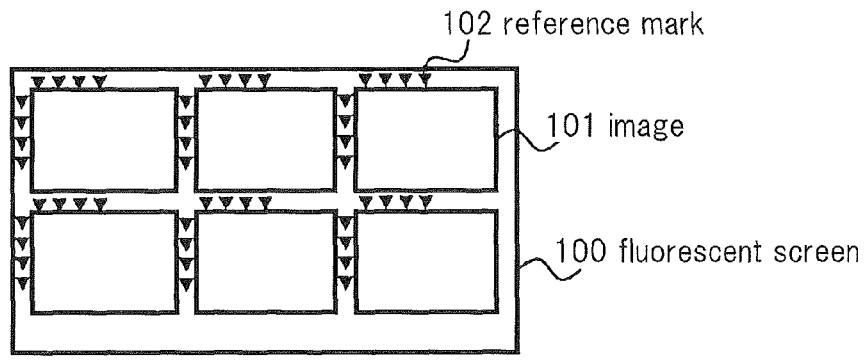
FIG. 1 is a schematic view showing an example of images that are displayed in a multi-projection system in which the device disclosed in Patent Document 1 is applied.

1 control means
2 optical detection means
4 scanning means
5 excitation light source
6 fluorescent screen
7 retroreflected light (or diffused reflection light)

Exemplary Embodiment

Exemplary embodiments of the present invention are next described with reference to the accompanying drawings.

First Exemplary Embodiment

Figure 2:
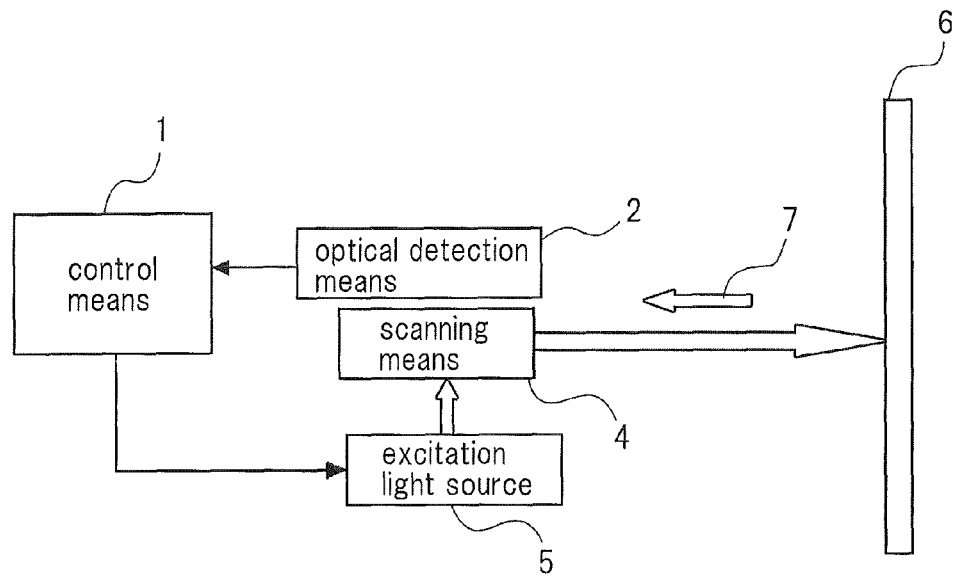
FIG. 2 is a block diagram showing the configuration of the projection-type image display device that is the first exemplary embodiment of the present invention.

FIG. 2 is a block diagram showing the configuration of the projection-type image display device that is the first exemplary embodiment of the present invention.

Referring to FIG. 2, the projection-type image display device includes: control means 1, optical detection means 2, scanning means 4, excitation light source 5, and fluorescent screen 6.

Excitation light source 5 is the component that supplies excitation light that excites phosphor formed on fluorescent screen 6, and is, for example, a laser light source of which a laser diode (LD) is representative. Scanning means 4 is the component that scans fluorescent screen 6 with the optical beam (excitation light) from excitation light source 5 and is constituted by, for example, a polygonal mirror, a galvano mirror, or an MEMS (Micro Electro Mechanical Systems) mirror. Scanning means 4 may be a biaxial scanning element capable of scanning in both the horizontal and vertical directions, or may be a construction in which two elements, a scanning element that scans in the horizontal direction and a scanning element that scans in the vertical direction, are combined. Scanning means 4 scans the excitation light in the horizontal direction and reverses the scanning direction on the left and right edges of fluorescent screen 6. Two-dimensional scanning of fluorescent screen 6 can be realized by scanning in the vertical direction at the same time as this scanning in the horizontal direction.

Fluorescent screen 6 is provided with a plurality of phosphor regions that are arranged cyclically in the in-plane direction, the regions between each phosphor region being black-material regions that prevent interference of fluorescent light from each of the phosphor regions (for example, black stripes). The phosphor regions are diffusion regions that receive excitation light and emit fluorescent light (diffused light).

Figure 3:
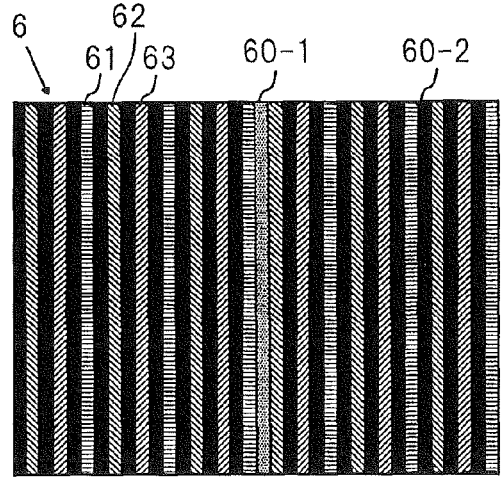
FIG. 3 is a schematic view showing a portion of the fluorescent screen for detecting the screen borders in the horizontal direction that is used in the projection-type image display device shown in FIG. 2.

FIG. 3 shows an example of fluorescent screen 6 for detecting image boundaries in the horizontal direction.

As shown in FIG. 3, fluorescent screen 6 includes phosphor regions 61-63, reference black stripe (BS) 60-1, and black stripes 60-2.

Phosphor regions 61 are regions in which a phosphor is formed that produces, for example, red fluorescent light. Phosphor regions 62 are region in which a phosphor is formed that produces, for example, green fluorescent light. Phosphor regions 63 are region in which a phosphor is formed that produces, for example, blue fluorescent light. In the example shown in FIG. 3, phosphor regions 61, 62, and 63 are formed cyclically in that order in a specific direction.

Reference black stripe 60-1 is formed, for example, between red phosphor region 61 and green phosphor region 62 in the vicinity of the screen center. In regions outside the vicinity of the screen center, black stripes 60-2 are formed between each of the regions of phosphor regions 61, 62, and 63.

In the example shown in FIG. 3, there is one reference black stripe 60-1, but the number of reference black stripes is not limited to one. A plurality of reference black stripes 60-1 may be arranged as appropriate on fluorescent screen 6.

Figure 4:
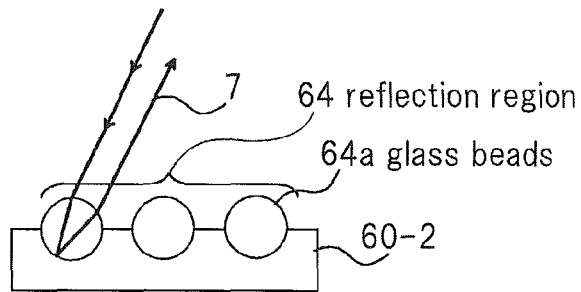
FIG. 4 is a schematic view showing an example of the retroreflection region of the fluorescent screen shown in FIG. 3.

FIG. 4 is a sectional view of black stripe 60-2.

Referring to FIG. 4, reflection region 64 is formed on the surface of black stripe 60-2 upon which excitation light is irradiated. Reflection region 64 is composed of a plurality of glass beads 64a that are of a retroreflective material. Glass beads 64a are spherical and have approximately their hemispherical portions embedded in the surface of black stripe 60-2. The remaining hemispherical portions of glass beads 64a are exposed from the surface of black stripe 60-2.

When the optical beam (excitation light) from excitation light source 5 passes over black stripe 60-2, the optical beam enters the exposed surfaces of glass beads 64a. The light that was entered is refracted at the obverse interface (the boundary between the surface of glass beads 64a and air).

Light that was entered into glass beads 64a is reflected at the interface of glass beads 64a and black stripe 60-2, and this reflected light exits from the obverse-side interface. The reflected light is refracted when it passes though the obverse-side interface, and the light that exits from this interface advances as retroreflected light 7 in the opposite direction of the incident light.

In order to reflect light that is entered into glass beads 64a at the interface between glass beads 64a and black stripe 60-2, black stripe 60-2 may contain, for example, a reflective material. Alternatively, the entire spheres of glass beads 64a may be covered by a semi-transmissive and semi-reflective film.

By designing glass beads 64a such that the focal point is formed at one point of the interface between glass beads 64a and black stripe 60-2, the retroreflected light 7 can be reliably caused to advance in the direction opposite that of incident light.

Reflection region 64 composed of glass beads 64a of this type can be formed using screen printing. Reflection region 64 may be formed by an optical part having retroreflectivity such as a retroreflection prism. Still further, reflection region 64 may be formed by a light-diffusing material. A light diffusing material may use particles of, for example, calcium carbonate or titanium oxide.

Again referring to FIG. 2, optical detection means 2 is constituted by, for example, a photodiode, and detects reflected light 7 from reflection region 64.

During calibration, control means 1 scans excitation light of a fixed intensity at a fixed scanning speed in a horizontal direction (a direction that crosses or is orthogonal to the longitudinal direction of phosphor regions 61-63), and acquires stripe boundary position information based on the output signal of optical detection means 2. Calibration means the correction of shifting of the relative positional relation between scanning means 4 and fluorescent screen 6. Calibration may be executed when power is turned on to projection-type image display device, or may be executed at each of fixed intervals, or at any time.

Figure 5:
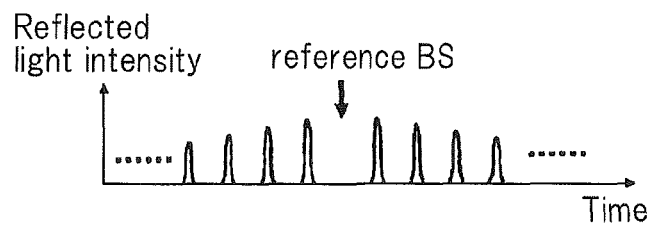
FIG. 5 shows the output signal of the optical detection means in the projection-type image display device shown in FIG. 2 when excitation light of a fixed intensity scans in the horizontal direction at a fixed scanning speed.

FIG. 5 gives a schematic representation of the output signal of optical detection means 2 when excitation light of a fixed intensity is scanned at a fixed scanning speed in the horizontal direction.

Because the stripe spacing of reference black stripe 60-1 and black stripes 60-2 is substantially uniform, when excitation light is scanned from the left edge toward the right edge of fluorescent screen 6 at a fixed scanning speed, optical detection means 2 detects reflected light 7 from reflection region 64 on each black stripe 60-2 at each of substantially fixed time intervals. On the other hand, because reflection regions 64 are not provided on reference black stripe 60-1, reflected light is not detected by optical detection means 2 even when excitation light is irradiated onto reference black stripe 60-1. Accordingly, as shown in FIG. 5, the output signals of optical detection means 2 are supplied as a waveform in pulse form at each of substantially fixed time intervals other than time zones in which excitation light is irradiated upon reference black stripe 60-1

In the output signal shown in FIG. 5, the portion in which the spacing of the pulse-form waveform is greater than other intervals is the portion in which excitation light is irradiated upon reference black stripe 60-1 (this corresponds to the position of reference black stripe 60-1). As a result, control means 1 is able to specify reference black stripe 60-1 based on the intervals of the waveform of the output signal of optical detection means 2.

In addition, because the number of waveforms of the pulse form of one horizontal scan interval is determined in advance, black stripe 60-2 of the outermost edge of the horizontal direction can be specified based on the number of waveforms from the position of reference black stripe 60-1. Control means 1 is provided with a counter that counts the number of pulse-shaped waveforms, and the count of waveforms by the counter starts when reference black stripe 60-1 is identified. Control means 1 then determines that the irradiation of excitation light upon black stripe 60-2 that is located on the outermost edge in the horizontal direction of fluorescent screen 6 when the count value of the counter reaches a predetermined value.

By thus detecting reference black stripe 60-1 based on the output waveform of optical detection means 2 and counting a predetermined number of phosphor stripes over which the beam spot of the excitation light passes from the position of reference black stripe 60-1 that was detected, control means 1 determines black stripe 60-2 of the outermost edge in the horizontal direction and, based on this determined position information, determines the display range in the horizontal direction. Here, the display range is the range that contains phosphor regions 61-63, reference black stripe 60-1, and black stripes 60-2. Control means 1 holds the information of the display range that was determined as stripe boundary position information. Control means 1 then controls the light emission timing of excitation light source 5 based on the stripe boundary position information.

After determining the display range, control means 1 irradiates excitation light within the display range based on the stripe boundary position information in horizontal scanning and adjusts the horizontal amplitude.

Depending on the characteristics of scanning means 4, there are cases in which scanning is not possible at a fixed speed in the horizontal direction. For example, this occurs when a resonant device is used. When a resonant device scans over a straight-facing screen, the position is represented by the following formula:

$$x(t) = \frac{z}{\cos\theta_v} \cdot \tan(\theta_{max}\sin\omega t) \qquad \text{[Formula 1]}$$

Here, $\theta_{max}$ is the maximum angle of horizontal scanning, $\omega$ is the horizontal scanning angular speed, $\theta_v$ is the vertical incident angle, and z is the distance to the screen.

As shown by the formula above, because the passage of time per unit length increases with increase in the horizontal scanning angle, a signal profile such as shown in FIG. 5 cannot be obtained. However, considering only the vicinity that is being scanned, this scanning can be seen as scanning at a substantially fixed speed, and the detection of reference black stripe 60-1 and the acquisition and control of stripe boundary position information can be realized by a method similar to that above-described.

In horizontal scanning, scanning reverses course in the vicinity of the outermost black stripe 60-2. Because reflected light is not produced during the interval of this reversal of scanning, the output waveform of optical detection means 2 includes an interval time that is the non-reflecting section.

Figure 6:
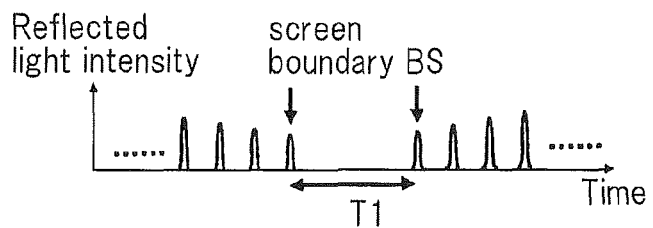
FIG. 6 is a view for describing the interval time that is contained in the output signal of the optical detection means when excitation light of a fixed intensity is scanned in the horizontal direction at a fixed scanning speed in the projection-type image display device shown in FIG. 2.

FIG. 6 shows an example of the output signal of optical detection means 2 that includes the interval time. After reflected light has been detected from black stripe 60-2 of the outermost edge, the irradiation of excitation light is halted. After scanning has reversed course, the irradiation of excitation light is again started at the position of black stripe 60-2 of the outermost edge. As a result, interval T1 from the irradiation of excitation light upon black stripe 60-2 of the outermost edge until excitation light is again irradiated upon black stripe 60-2 of the outermost edge is taken as the interval time that is the non-irradiation section in the output signal of optical detection means 2.

Figure 7:
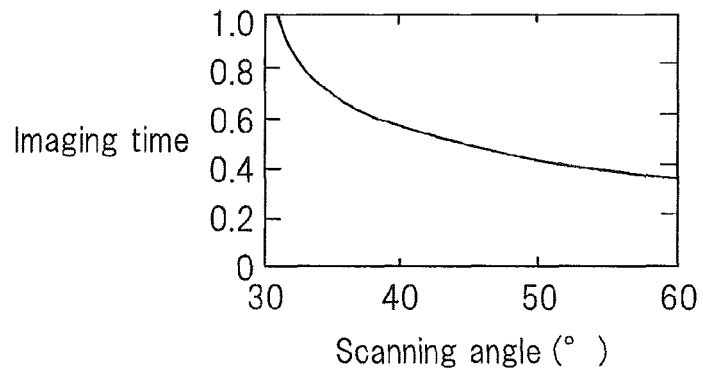
FIG. 7 shows an example of the look-up table that indicates the correspondence relation between the scanning angle and the imaging time of one horizontal line.

Control means 1 refers to a look-up table that shows the correspondence relation between the scanning angle and the interval time of one horizontal line. FIG. 7 shows a look-up table that shows the correspondence relation between the scanning angle and the imaging time of one horizontal line as an example of such a look-up table. The vertical axis shows the normalized imaging time, and the horizontal axis shows the scanning angle (°). Here, the normalized imaging time is given by a value obtained by subtracting interval time T1 from 1.

Control means 1 refers to the look-up table and implements control of the scanning angle of scanning means 4 such that interval time T1 is the optimum value. For example, when scanning means 4 is realized by MEMS, control means 1 implements control of the scanning angle by controlling the voltage that is supplied to the MEMS without changing the frequency.

In addition, reference black stripe 60-1 in the vicinity of the screen center is not absolutely necessary. Any black stripe 60-2 on the screen may be used as reference black stripe 60-1.

The operation of the light emission timing of the projection-type image display device of the present exemplary embodiment is next described.

Figure 8:
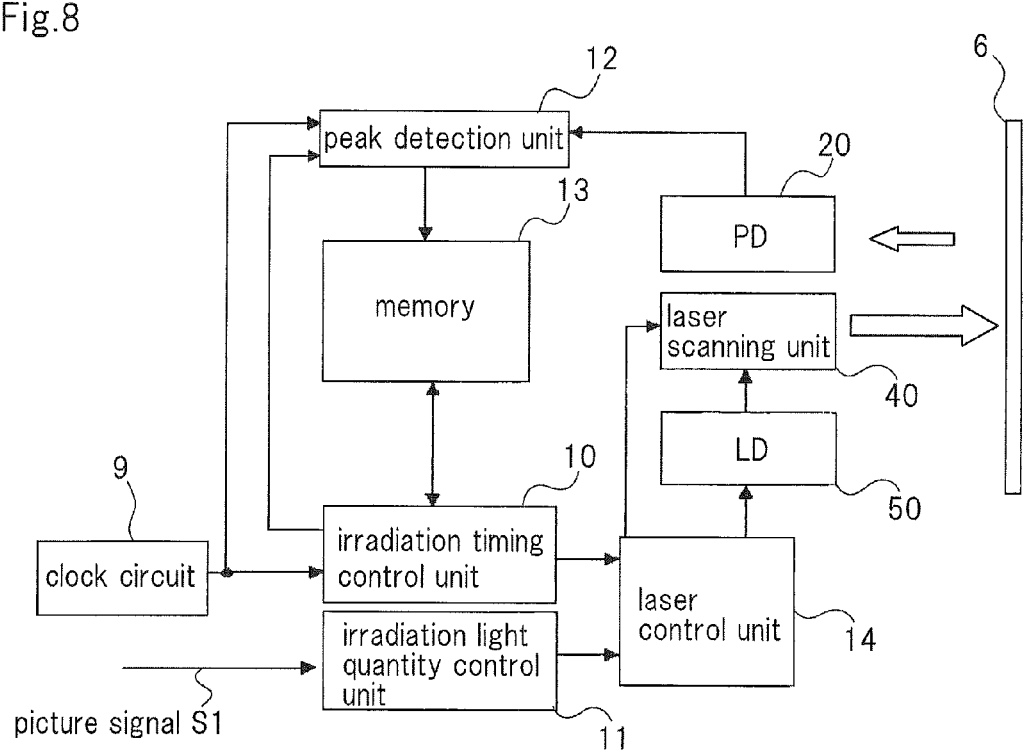
FIG. 8 is a block diagram showing the principal configuration of the projection-type image display device shown in FIG. 2.

FIG. 8 is a block diagram showing the configuration that relates to light emission timing control of the projection-type image display device.

Referring to FIG. 8, the projection-type image display device includes: fluorescent screen 6, clock circuit 9, irradiation timing control unit 10, irradiation light quantity control unit 11, peak detection unit 12, memory 13, laser control unit 14, PD (photodiode) 20, laser scanning unit 40, and LD (laser diode) 50. Memory 13 holds stripe boundary position information.

Irradiation timing control unit 10, irradiation light quantity control unit 11, peak detection unit 12, memory 13 and laser control unit 14 are each functions provided in control means 1 shown in FIG. 2. Memory 13 may be provided separately from control means 1.

PD 20, laser scanning unit 40, and LD 50 correspond to optical detection means 2, scanning means 4, and excitation light source 5, respectively, shown in FIG. 2.

Based on the stripe boundary position information that is stored in memory 13, irradiation timing control unit 10 both supplies laser control unit 14 with irradiation timing instruction signals for controlling the drive timing (light emission timing) of LD 50 and supplies peak detection unit 12 with imaging start timing signals.

Based on video signals S1 from the outside, irradiation light quantity control unit 11 supplies laser control unit 14 with irradiation light quantity instruction signals for controlling the magnitude (corresponding to light quantity) of the drive power that is supplied to LD 50.

Laser control unit 14 both drives LD 50 in accordance with the irradiation timing instruction signals from irradiation timing control unit 10 and adjusts the drive power to LD 50 in accordance with the irradiation light quantity instruction signals from irradiation light quantity control unit 11. Laser control unit 14 further controls laser scanning unit 40 in accordance with the irradiation timing instruction signal from irradiation timing control unit 10.

After carrying out calibration, the above-described light emission timing control is implemented in the image display mode.

Figure 9:
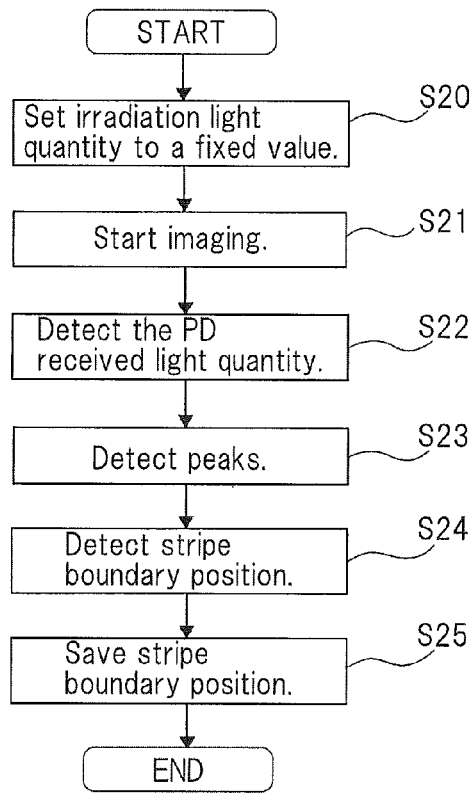
FIG. 9 is a flow chart showing the procedure for creating the stripe boundary position information that is carried out at the time of calibrating the projection-type image display device shown in FIG. 8.

FIG. 9 is a flow chart showing the procedure of creating the stripe boundary position information during calibration.

Referring to FIG. 9, irradiation light quantity control unit 11 first supplies laser control unit 14 with an irradiation light quantity instruction signal indicating that the irradiation light quantity is to be a fixed value. Laser control unit 14 then sets the drive power of LD 50 to a fixed value in accordance with the irradiation light quantity instruction signal (Step S20).

Irradiation timing control unit 10 next both supplies peak detection unit 12 with an imaging start timing signal and supplies laser control unit 14 with an irradiation timing instruction signal for controlling the drive timing (Step S21). In this case, the irradiation timing instruction signal is a signal indicating that LD 50 is to be caused to emit light continuously for fixed interval. Here, the fixed interval is an interval that corresponds to, for example, one frame.

PD 20 next detects the retroreflected light (or the diffused reflected light) 7 (Step S22), and peak detection unit 12 detects the peaks of the output waveform from PD 20 (Step S23). Peak detection unit 12 then detects the stripe boundary positions based on the timing of the appearance of peaks (Step S24). The stripe boundary positions can be found from, for example, the result of counting the time from the imaging start time until the peak appearance time based on the clock signal from clock circuit 9.

Finally, peak detection unit 12 creates stripe boundary position information based on the detection results of the stripe boundary positions and stores the stripe boundary position information in memory 13 (Step S25).

Alternatively, peak detection unit 12 may detect, instead of the timing of the appearance of peaks of the detection waveform, the timing of the rise or fall of the signal waveform that is equal to or greater than a threshold value. After detection of the rise or fall, similar control can be carried out by detecting the stripe boundary positions similar to peak detection, creating the stripe boundary position information based on the detection results, and storing the stripe boundary position information in memory 13.

In the projection-type image display device of the present exemplary embodiment, black stripes are vertical stripes, but horizontal stripes (horizontal black stripes) may be used in place of vertical stripes. Horizontal black stripes cross or are orthogonal to vertical black stripes. In this case, scanning is carried out such that the optical beam diagonally crosses the horizontal black stripes.

According to the projection-type image display device of the present exemplary embodiment, the boundaries of the display region are detected while scanning fluorescent screen 6 with an optical beam from excitation light source 5 to display an image, and the light emission timing of excitation light source 5 can be controlled during the next scanning (image display of the next input frame) based on the detected boundaries. According to this control, the optical beam can always be irradiated upon the display region at the optimum timing.

When the projection-type image display device of the present exemplary embodiment is used to construct a multi-projection system, a plurality of units having the configuration shown in FIG. 2 are prepared. Fluorescent screens 6 of each unit are joined together to make one fluorescent screen. In this case, the display ranges of each unit are entire fluorescent screen 6 shown in FIG. 3.

Alternatively, one fluorescent screen of the construction shown in FIG. 3 may be divided into a plurality of screens and units then provided corresponding to each screen. In this case, the display range of the units is the entirety of the corresponding divided screens.

According to the present exemplary embodiment, an emission unit for producing readable light and made up by reflection regions 64 is formed for identifying the display range in the region in which reference black stripe 60-1 and black stripes 60-2 are formed. The display region can be identified by reading the light of a specific pattern that is emitted by the light-emission unit while scanning excitation light, and an image based on input video signals is projected in the display range that was identified.

Because display ranges can thus be accurately identified based on light-emission units (specific patterns) that are formed in the region in which black stripes are formed without the need for providing reference marks in the seam portions of each fluorescent screen, the effect is obtained in which seams between adjacent images become difficult to perceive when applied to a multi-projection system.

In addition, because display ranges can be detected automatically, the precision that is required when installing projectors or fluorescent screens when assembling a multi-projection system can be reduced, with the result that the burden placed on workers in assembly work can be reduced.

In the projection-type image display device of the present exemplary embodiment, the black stripes in the boundaries of the display ranges may be used as reference black stripe 60-1. In this case, horizontal amplitude that covers the display range is given in advance.

In addition, when reference black stripe 60-1 is set in regions other than the center of the display range, the horizontal amplitude may be adjusted based on the timing of detecting reflected light from reference black stripe 60-1 instead of the interval time.

Second Exemplary Embodiment

The projection-type image display device of the present exemplary embodiment differs from that of the first exemplary embodiment in that a pattern for specifying the display range in the vertical direction is provided on fluorescent screen 6.

Figure 10:
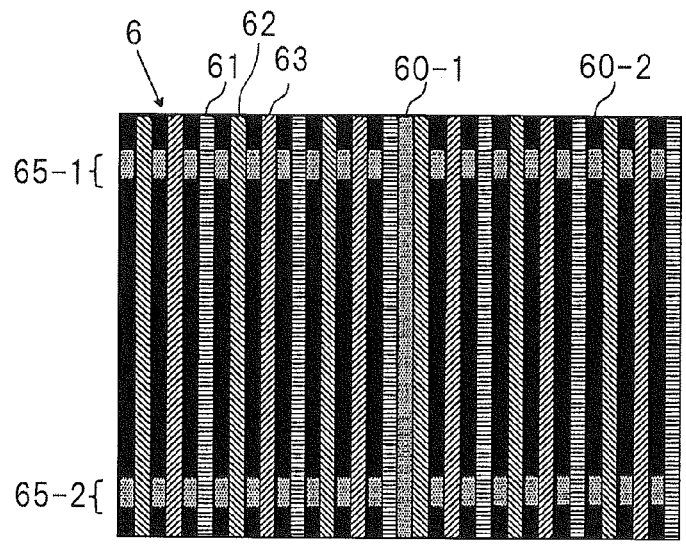
FIG. 10 is a schematic view showing a portion of the fluorescent screen that is used in the projection-type image display device of the second exemplary embodiment of the present invention.

FIG. 10 shows an example of fluorescent screen 6. Referring to FIG. 10, horizontal reference lines 65-1 and 65-2 are provided as a pattern for identifying the display range in the vertical direction. Horizontal reference lines 65-1 and 65-2 are formed parallel along the horizontal scanning direction.

Reflection region 64 is formed on each black stripe 60-2 in regions other than horizontal reference lines 65-1 and 65-2. In other words, horizontal reference lines 65-1 and 65-2 are formed by regions on each black stripe 60-2 in which there is no reflection region 64, and excitation light that is irradiated upon horizontal reference lines 65-1 and 65-2 is absorbed by black stripes 60-2. The width (width in the vertical direction) of each of horizontal reference lines 65-1 and 65-2 is one picture element or more.

Reflection region 64 is formed by an optical part having retroreflectivity or a light-diffusing material, similar to the first exemplary embodiment.

Each part of the projection-type image display device of the present exemplary embodiment is basically the same as that of the first exemplary embodiment, and the operation of identifying the display range in the vertical direction is therefore here described in detail, and the operation of identifying the display range in the horizontal direction is omitted.

Figure 11:
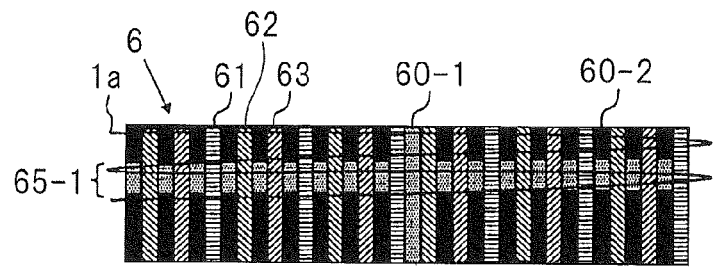
FIG. 11 is a schematic view showing the scanning track when the fluorescent screen shown in FIG. 10 is scanned by excitation light.

As shown in FIG. 11, scanning means 4 scans fluorescent screen 6 with excitation light from excitation light source 5 as shown by wave-shaped scan track 1a. According to scan track 1a, excitation light scans in the horizontal direction from the left edge to the right edge along the horizontal scan line above horizontal reference line 65-1. The scanning direction then reverses at the right edge of fluorescent screen 6.

After reversal of the scanning direction, excitation light scans in the horizontal direction from the right edge to the left edge along horizontal reference line 65-1. The scanning direction then reverses at the left edge of fluorescent screen 6.

After reversal of the scanning direction, excitation light scans in the horizontal direction from the left edge to the right edge along the horizontal scanning line below horizontal reference line 65-1. The scanning direction then reverses at the right edge of fluorescent screen 6.

Fluorescent screen 6 can thus be scanned two-dimensionally by scanning in the horizontal direction and scanning in the vertical direction at the same time.

Figure 12:
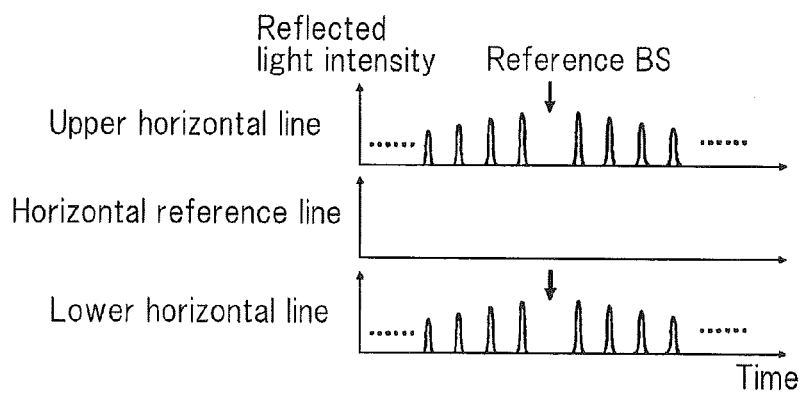
FIG. 12 shows the output signal of the optical detection means when scanning is carried out on the scanning track shown in FIG. 10.

FIG. 12 gives a schematic representation of the output signal of optical detection means 2 when excitation light of substantially fixed intensity is scanned at a fixed scanning speed in regions that include horizontal reference line 65-1 and horizontal scanning lines located above and below reference line 65-1. In this example, the width of horizontal reference line 65-1 is a width that corresponds to one picture element.

On the horizontal scanning lines above and below horizontal reference line 65-1, optical detection means 2 detects, for each of substantially fixed times, reflected light 7 from reflection region 64 on each black stripe 60-2 in regions other than reference black stripe 60-1. On the other hand, because reflection region 64 is not provided on horizontal reference line 65-1, reflected light 7 is not detected by optical detection means 2 along the entirety of horizontal reference line 65-1. Accordingly, control means 1 is able to identify horizontal reference line 65-1 in the vertical direction based on the presence or absence of detection of reflected light 7 in the output signal of optical detection means 2.

Horizontal reference line 65-2 can also be identified similarly to horizontal reference line 65-1.

Because the number of horizontal scan lines has been determined in advance, control means 1 is able to identify horizontal scan lines that are located on the outermost edges in the vertical direction of fluorescent screen 6 by counting the number of horizontal scan lines from the positions of horizontal reference lines 65-1 and 65-2.

In the projection-type display device of the present exemplary embodiment, control means 1 detects horizontal reference line 65-1 and 65-2 based on the output waveform of optical detection means 2, identifies the outermost horizontal scan line in the vertical direction by counting a predetermined number of horizontal scan lines that the excitation light has passed from the position of horizontal reference lines 65-1 and 65-2 that were detected, and based on this identified position information, determines the display range in the vertical direction. Control means 1 determines the display range in the horizontal direction in the same way as the first exemplary embodiment.

Control means 1 holds the information of the display ranges in the horizontal direction and vertical direction that were determined. Control means 1 then controls the light emission timing of excitation light source 5 based on the boundary position information.

After determining the display ranges, control means 1 irradiates excitation light within the display ranges based on the boundary position information in each of horizontal scanning and vertical scanning and adjusts the horizontal and vertical amplitude.

In addition to the effect of the first exemplary embodiment, the projection-type display device of the present exemplary embodiment has the effect of enabling accurate identification of the display range not only in the horizontal direction but in the vertical direction as well, whereby seams between adjacent images are even more difficult to discern when applied to a multi-projection system.

In the projection-type image display device of the present exemplary embodiment, two horizontal reference lines 65-1 and 65-2 are used to identify the display range in the vertical direction, but the number of horizontal reference lines is not limited to this form. Three or more horizontal reference lines may be provided.

In addition, the number of black stripes 60-2 that are required in the formation of horizontal reference lines may be one or more in each of the horizontal reference lines.

The horizontal reference lines are formed in the vicinity of the boundaries of the display range in the vertical direction. More specifically, the horizontal reference lines are formed one horizontal scan line inward from the boundary horizontal scan lines.

Even in cases in which the horizontal scanning speed is not fixed due to the characteristics of scanning means 4, the detection of reference black stripes 60-1, acquisition of the stripe boundary position information, and control can be realized by the same method if the scanning speed is seen as approximately a fixed speed in the vicinity of the scanning point.

Third Exemplary Embodiment

The projection-type image display device of the present exemplary embodiment differs from the first exemplary embodiment in that light diffusion regions 63-1 are used in place of blue phosphor region 63 of fluorescent screen 6 and reflection region 64 is formed on reference black stripe 60-1 and not on black stripes 60-2.

In addition, reflection region 64 is formed by an optical part having retroreflectivity or a light-diffusing material, similar to the first exemplary embodiment and second exemplary embodiment.

Figure 13:
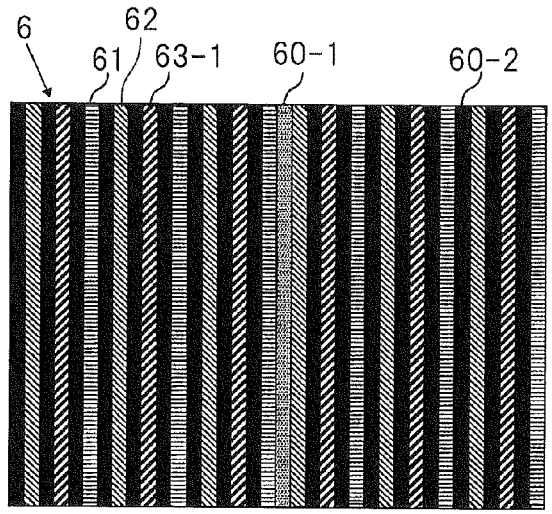
FIG. 13 is a schematic view showing a portion of the fluorescent screen that is used in the projection-type image display device of the second exemplary embodiment of the present invention.

FIG. 13 shows an example of fluorescent screen 6. Referring to FIG. 13, light diffusion regions 63-1 are provided in place of blue phosphor regions 63.

Excitation light source 5 emits blue excitation light having peak wavelength in the blue wavelength band. Light diffusion regions 63-1 receive the blue excitation light from excitation light source 5 and emit blue diffused light. The blue diffused light exits from both surfaces of fluorescent screen 6.

In the projection-type image display device of the present exemplary embodiment as well, control means 1 scans excitation light of fixed intensity in the horizontal direction at a fixed scanning speed, and acquires stripe boundary position information based on the output signal of optical detection means 2.

Figure 14:
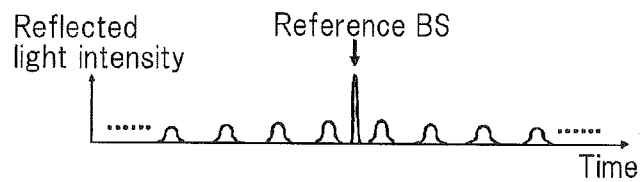
FIG. 14 shows the output signal of the optical detection means when the fluorescent screen shown in FIG. 13 is scanned by excitation light of a fixed intensity in the horizontal direction at a fixed scanning speed.

FIG. 14 gives a schematic representation of the output signal of optical detection means 2 when excitation light of a fixed intensity is scanned in the horizontal direction at a fixed scanning speed.

Because the stripe spacing of light diffusion regions 63-1 is substantially uniform, when excitation light is scanned from the left edge to the right edge on fluorescent screen 6 at a substantially fixed scanning speed, optical detection means 2 detects diffused light from each light diffusion region 63-1 for each substantially fixed time interval.

In addition, reference black stripe 60-1 is arranged between light diffusion regions 63-1 in the vicinity of the screen center, and reflection region 64 is formed on reference black stripe 60-1. When excitation light is irradiated upon reference black stripe 60-1, the retroreflected light (or diffused reflection light) is detected in optical detection means 2.

The peak value of the detected waveform of diffused light from light diffusion regions 63-1 is usually sufficiently lower than the peak value of the detected waveform of the retroreflected light (or diffused reflection light) from reference black stripe 60-1. As a result, control means 1 is able to identify reference black stripe 60-1 based on the peak value of the detected waveform.

In addition, when the width of reflection region 64 that is formed on reference black stripe 60-1 is narrow or a light diffusing material is used in reflection region 64, the peak value of the detected waveform of the retroreflected light (or diffused reflection light) is in some cases not particularly high. In these cases, control means 1 is able to identify reference black stripe 60-1 by using the waveform peak or the rise or fall of the waveform that is detected at timings that differ from those of surrounding light diffusion regions 63-1. In addition, the pulse width of the detected pulse of the retroreflected light (or diffused reflection light) from reference black stripe 60-1 is smaller than the pulse width of the detected pulse of the diffused light from light diffusion regions 63-1. As a result, the detected pulse of the retroreflected light (or diffused reflection light) can be distinguished from the detected pulses of the diffused light from light diffusion regions 63-1 by means of the difference in pulse width.

Because the number of light diffusion regions 63-1 in the horizontal direction has been determined in advance, the outermost light diffusion region 63-1 in the horizontal direction can be identified based on the number of waveforms from the position of reference black stripe 60-1 and the outermost black stripe 60-2 can be identified based on this position.

Control means 1 determines the display range in the horizontal direction based on the positions of the outermost black stripes 60-2. Control means 1 holds the information of the display range that was determined as the stripe boundary position information. Control means 1 then controls the light emission timing of excitation light source 5 based on the stripe boundary position information.

After determining the display range, control means 1 irradiates excitation light within the display range based on the stripe boundary position information in horizontal scanning and adjusts the horizontal amplitude. The adjustment of the horizontal amplitude is similar to that of the first exemplary embodiment.

The projection-type image display device of the present exemplary embodiment exhibits the same effects as the first exemplary embodiment.

Reference black stripe 60-1 may be provided on any black stripe of fluorescent screen 6 and may be one or more in number.

A black stripe between red phosphor region 61 and green phosphor region 62 is preferably used as reference black stripe 60-1. In this case, there is no crosstalk between the detected waveform of the retroreflected light (or diffused reflection light) from reference black stripe 60-1 and the detected waveform of diffused light from light diffusion region 63-1, and the peak value or rise and fall timing can be obtained more accurately. This configuration is particularly advantageous when using the waveform peak and waveform rise/fall that is detected at a different timing than surrounding light diffusion regions 63-1 to identify reference black stripe 60-1.

The projection-type image display device of the present exemplary embodiment can be applied to the device of the second exemplary embodiment. More specifically, horizontal reference lines 65-1 and 65-2 shown in FIG. 10 are formed on the projection screen shown in FIG. 13 and reflection regions 64 are formed in the regions in which each of reference lines 65-1 and 65-2 are formed on each black stripe 60-2.

In the case described above, when, for example, excitation light of a fixed intensity scans along horizontal reference line 65-1 at a fixed scanning speed, the output signal of optical detection means 2 becomes a signal in which the detected waveform of retroreflected light (or diffused reflection light) from reflection region 64 is inserted between the detected waveforms of the diffused light from each light diffusion region 63-1 in the output waveform shown in FIG. 14. The peak value of the detected waveform of the diffused light is sufficiently lower than the peak value of the detected waveform of retroreflected light (or diffused reflection light), whereby the detected waveforms of the diffused light and the retroreflected light (or diffused reflection light) can be distinguished.

The output signal of optical detection means 2 in horizontal reference line 65-2 is also an output waveform similar to that described above.

On the other hand, the output signal of optical detection means 2 in regions other than horizontal reference lines 65-1 and 65-2 is an output waveform such as shown in FIG. 14.

Accordingly, control means 1 identifies horizontal reference lines 65-1 and 65-2 based on the presence or absence of the detected waveform of retroreflected light (or diffused reflection light), and by counting the number of horizontal lines from the identified positions, is able to identify the outermost black stripes 60-2 in the vertical direction. Control means 1 is then able to identify the display range in the vertical direction based on the positions of black stripes 60-2 that have been identified.

In the present exemplary embodiment as well, three or more horizontal reference lines may be provided.

The projection-type image display devices of the first to third exemplary embodiments described hereinabove are only examples of the present invention and their configuration may be modified as appropriate.

For example, a phase-difference layer (for example, a quarter-wave layer) may be provided in reference black stripe 60-1 and reflection regions 64 may be formed on black stripes 60-2. In this case, the polarization direction of reflected light can be converted from P-polarized light to S-polarized light or converted from S-polarized light to P-polarized light in the area provided with the quarter-wave layer. Optical detection means 2 detects the first or second polarized light in which the polarization components differ from each other. In this case, the received quantity of reflected light from reflection region 64 differs from the received quantity of reflected light from quarter-wave layer (S-polarized light or P-polarized light) in the output signal of optical detection means 2, whereby reference black stripe 60-1 and black stripes 60-2 can be distinguished. As a result, the display range can be identified by counting the number of black stripes 60-2 from the position of reference black stripe 60-1.

In the case described hereinabove, optical detection means 2 may include: a polarization beam splitter that separates incident light into first and second polarized light in which the polarization components differ from each other (P-polarized light and S-polarized light); a first optical detector that detects the first polarized light that was separated in the polarization beam splitter; and a second optical detector that detects the second polarized light that was separated in the polarization beam splitter. In this case, optical detection means 2 may detect the proportion of the detected value of the second polarized light that was supplied from the second optical detector with respect to the detected value of the first polarized light that was supplied from the first optical detector (the proportion of the P-polarized light to S-polarized light). In this case as well, reference black stripe 60-1 and black stripes 60-2 can be distinguished, whereby the display range can be identified by counting the number of black stripes 60-2 from the position of reference black stripe 60-1.

Alternatively, in the projection-type image display device of each exemplary embodiment, reflection regions 64 may be provided on both reference black stripe 60-1 and black stripes 60-2, and the device may be configured such that the width of reflection region 64 on reference black stripe 60-1 differs from the width of reflection regions 64 on black stripes 60-2. In this case, the light quantity or the timing of reception that is detected at optical detection means 2 differs for the reflected light from reference black stripe 60-1 and the reflected light from black stripes 60-2, whereby reference black stripe 60-1 and black stripes 60-2 can be distinguished. As a result, the display range can be identified by counting the number of black stripes 60-2 from the position of reference black stripe 60-1.

Still further, in the projection-type image display devices of each exemplary embodiment, reflection regions 64 may be provided on both reference black stripe 60-1 and black stripes 60-2, and the device may then be configured such that the width of reference black stripe 60-1 differs from the width of black stripes 60-2. In this case as well, the light quantity or timing of reception detected at optical detection means 2 differs for the reflected light from reference black stripe 60-1 and the reflected light from black stripes 60-2, whereby reference black stripe 60-1 and black stripes 60-2 can be distinguished. As a result, the display range can be identified by counting the number of black stripes 60-2 from the positions of reference black stripe 60-1.

Further, in the projection-type image display device of each exemplary embodiment, a specific reflective pattern (for example, a black and white pattern) that is optically readable may be formed on reference black stripe 60-1, and reflection regions 64 may be formed on black stripes 60-2. In this case, control means 1 is able to read the specific pattern based on the output signals of optical detection means 2 and identify reference black stripe 60-1. As a result, the display range can be identified by counting the number of black stripes 60-2 from the position of reference black stripe 60-1.

Again, in the projection-type image display device of each exemplary embodiment, an infrared phosphor in which the emitted color is infrared may be formed on reference black stripe 60-1 and reflection regions 64 may be formed on black stripes 60-2. In the infrared phosphor region, the infrared phosphor is excited by the excitation light from scanning means 4 and infrared fluorescent light is emitted from the infrared phosphor. Optical detection means 2 includes: wavelength-separating means that separates infrared light and visible light; first optical detector that detects the infrared light among the infrared light and visible light that were separated in the wavelength-separating means; and second optical detector that detects visible light. Reference black stripe 60-1 is identified based on the output signal of the first optical detector, and black stripes 60-2 are identified based on the output signal of the second optical detector. As a result, the display range can be identified by counting the number of black stripes 60-2 from the position of reference black stripe 60-1.

In the projection-type image display device of each exemplary embodiment, a wavelength-selecting layer may be formed on reference black stripe 60-1, and reflection regions 64 may be formed on black stripes 60-2. Excitation light source 5 includes a plurality of light sources in which wavelengths differ and a color-combining means that combines the light from these light sources. The combined light from the color-combining means is supplied to scanning means 4. The wavelength-selecting layer reflects, of the excitation light that is emitted from each light source, excitation light of a specific wavelength. Optical detection means 2 detects by wavelength the reflected light from reference black stripe 60-1 and black stripes 60-2. In optical detection means 2, reflected light is judged to be from black stripes 60-2 when reflected light is received that corresponds to wavelengths of each light source, and reflected light is judged to be from reference black stripe 60-1 when only the specific wavelength is detected. In this case as well, reference black stripe 60-1 and black stripes 60-2 can be distinguished. As a result, the display range can be identified by counting the number of black stripes 60-2 from the position of the reference black stripe 60-1.

In the case described hereinabove, the wavelength-selecting layer may attenuate, of the excitation light that is emitted from each light source, excitation light of a specific wavelength and reflect wavelengths other than the specific wavelength. Optical detection means 2 detects by wavelength the reflected light from reference black stripe 60-1 and black stripes 60-2. In optical detection means 2, reflected light that is received is judged to be reflected light from black stripes 60-2 when the reflected light corresponds to wavelengths of each light source, and reflected light is judged to be from reference black stripe 60-1 when wavelength other than the specific wavelength is detected. In this case as well, reference black stripe 60-1 and black stripes 60-2 can be distinguished. As a result, the display range can be identified by counting the number of black stripes 60-2 from the position of reference black stripe 60-1.

In the projection-type image display device of each exemplary embodiment, a reflection layer may be provided on the scanning surface side of fluorescent screen 6 that transmits excitation light and that reflects visible light, whereby higher luminance can be achieved because fluorescent light (diffused light) that advances from phosphor regions toward the scanning surface side is reflected in the reflection layer toward the side of fluorescent screen 6 that is opposite the scanning surface side (display surface side).

Even in cases in which, due to the characteristics of scanning means 4, the horizontal scanning speed is not uniform, the detection of reference black stripe 60-1, the acquisition of stripe boundary position information, and control can be realized by the same methods by taking the horizontal scanning speed as a substantially uniform speed in the vicinity of the scanning point.

Fourth Exemplary Embodiment

Figure 15:
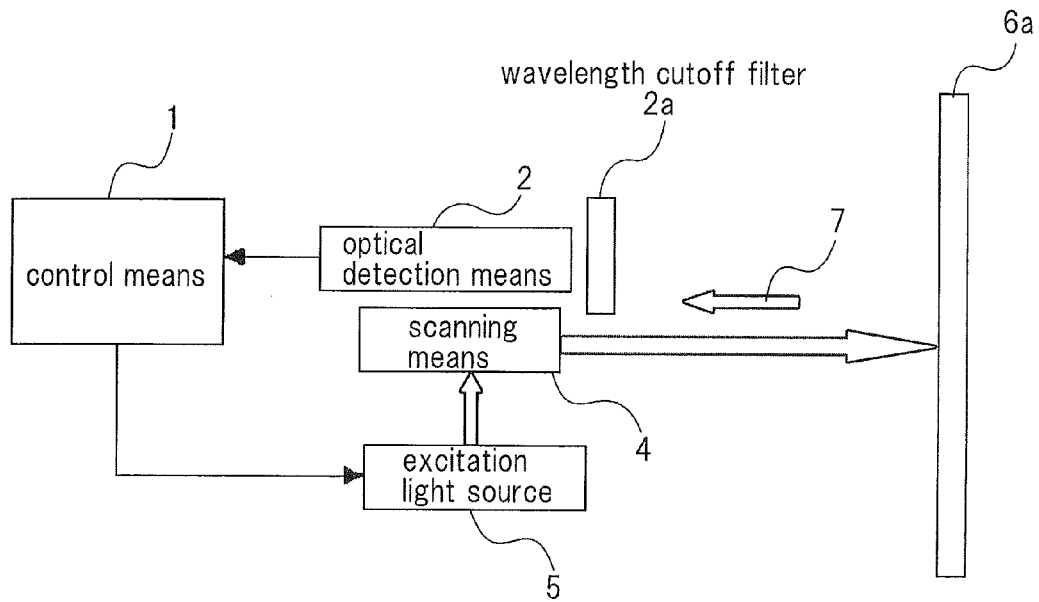
FIG. 15 is a block diagram showing the configuration of the projection-type image display device that is the fourth exemplary embodiment of the present invention.

FIG. 15 is a block diagram showing the configuration of the projection-type image display device that is the fourth exemplary embodiment of the present invention.

The projection-type image display device of the present exemplary embodiment differs from the device of the first exemplary embodiment in that fluorescent screen 6a in which a portion differs from fluorescent screen 6 is used and in that wavelength cutoff filter 2a is provided on the light-receiving surface of optical detection means 2 or at a position that faces the light-receiving surface. In FIG. 15, components that are identical to the first exemplary embodiment are given the same reference numbers.

Figure 16:
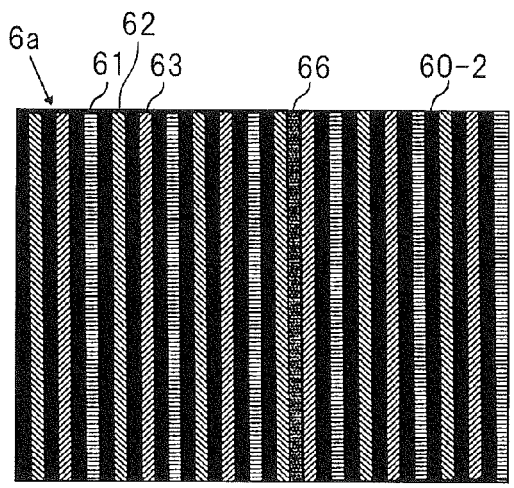
FIG. 16 is a schematic view showing the configuration of the fluorescent screen of the projection-type image display device shown in FIG. 15.

FIG. 16 shows an example of fluorescent screen 6a.

Referring to FIG. 16, fluorescent screen 6a includes phosphor regions 61-63, black stripes 60-2, and reference mark 66. Phosphor regions 61-63 and black stripes 60-2 are the same as those shown in FIG. 3.

Reference mark 66 is a stripe-shaped region to which has been applied an infrared phosphor for which the wavelength of the emitted light color is contained in the infrared wavelength band, and is formed, for example, between blue phosphor region 63 and green phosphor region 62 in the vicinity of the screen center. The width of reference mark 66 (the length in the horizontal direction) is approximately the same as the width of black stripes 60-2 and less than the width of phosphor regions 61-63. Black stripes 60-2 are formed between each of phosphor regions 61,62, and 63 in regions outside the vicinity of the screen center.

Black stripe 60-2 is formed between blue phosphor region 63 and green phosphor region 62 in the vicinity of the screen center, and reference mark 66 may be formed on black stripe 60-2.

Although there is one reference mark 66 in the example shown in FIG. 16, the present invention is not limited to this form. A plurality of reference marks 66 may be arranged as appropriate on fluorescent screen 6.

In the projection-type image display device of the present exemplary embodiment, as in each of the previously described exemplary embodiments, control means 1, during calibration, scans excitation light of a fixed intensity at a fixed scanning speed in the horizontal direction.

When excitation light of a fixed intensity is scanned in the horizontal direction, each of red fluorescent light, green fluorescent light, and blue fluorescent light is emitted from phosphor regions 61, 62, and 63, respectively, and infrared fluorescent light is emitted from reference mark 66. The red fluorescent light, green fluorescent light, blue fluorescent light, and infrared fluorescent light are all isotropic diffused light, and a portion of each fluorescent light is emitted to the reverse-surface side (the side of optical detection means 2).

In addition, a portion of the excitation light is diffused by the phosphor in each of phosphor regions 61, 62, and 63, and reference mark 66, and a portion of this diffused excitation light is emitted to the reverse-surface side.

Still further, when excitation light is irradiated upon the surface of fluorescent screen 6a, a portion of the excitation light is reflected by this surface.

Wavelength cutoff filter 2a shown in FIG. 15 has filter characteristics in which light of the red wavelength band (for example, 650 nm-750 nm) and the infrared wavelength band (for example, 750 nm or more) passes through wavelength cutoff filter 2a and in which light of other wavelength bands (for example, less than 650 nm) is absorbed or reflected by wavelength cutoff filter 2a. Accordingly, of the red fluorescent light, green fluorescent light, blue fluorescent light, and infrared fluorescent light emitted to the rear-surface side, red fluorescent light and infrared fluorescent light pass through wavelength cutoff filter 2a and are then supplied to optical detection means 2. The green fluorescent light and blue fluorescent light are absorbed or reflected by wavelength cutoff filter 2a. In addition, the diffused light and reflected light of the excitation light from fluorescent screen 6a is also absorbed or reflected by wavelength cutoff filter 2a.

Figure 17:
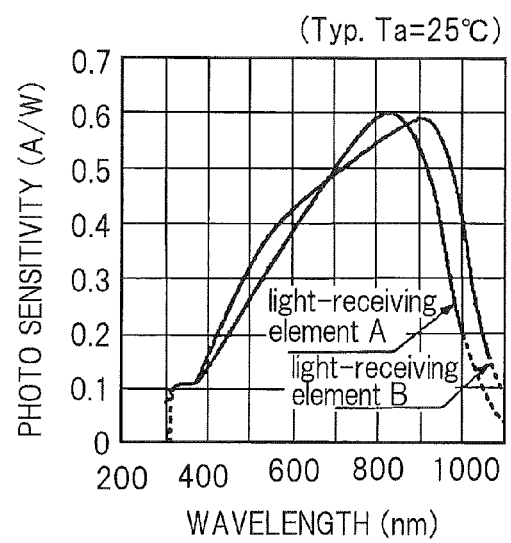
FIG. 17 is a characteristics diagram showing representative sensitivity characteristics of a silicon PD.

Optical detection means 2 is a photodiode (PD) in which, for example, the main component of the light-receiving part is composed of silicon. FIG. 17 shows a sensitivity characteristic that is representative of a silicon PD. Referring to FIG. 17, the photosensitivity of a silicon PD is at a maximum in the vicinity of 800 nm.

If a PD having the sensitivity characteristic shown in FIG. 17 is used as optical detection means 2, the red fluorescent light and infrared fluorescent light that pass through wavelength cutoff filter 2a can be efficiently detected.

Figure 18:
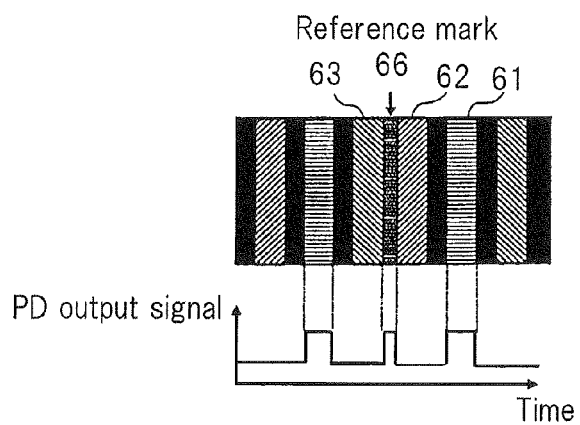
FIG. 18 is a schematic view showing the correspondence relation between the output signal of optical detection means and a phosphor region and reference pattern when excitation light of a fixed intensity is scanned in the horizontal direction at a fixed scanning speed in the projection-type image display device shown in FIG. 15.

FIG. 18 gives a schematic representation of the correspondence relation between the output signal of optical detection means 2 and phosphor regions 61, 62, 63, and reference pattern 66 when excitation light of a fixed intensity is scanned at a fixed scanning speed in the horizontal direction.

As shown in FIG. 18, the output signal of optical detection means 2 includes detected pulses of the red fluorescent light from phosphor regions 61 and detected pulses of the infrared fluorescent light from reference mark 66. The pulse width of the detected pulses of the infrared fluorescent light is smaller than the pulse width of the detected pulses of the red fluorescent light. As a result, the detected pulses of the red fluorescent light and the detected pulses of the infrared fluorescent light can be distinguished by the difference in pulse width.

In addition, the detected pulses of the red fluorescent light are at a fixed interval, whereby the detected pulses of the infrared fluorescent light can be identified based on the pulse spacing.

Control means 1 refers to the output signal of optical detection means 2 and identifies reference mark 66 based on the timing of the rise of the detected pulse of the infrared fluorescent light.

In addition, because the number of detected pulses of red fluorescent light in one horizontal scanning interval is determined in advance, the outermost black stripe 60-2 in the horizontal direction can be identified based on the number of detected pulses of red fluorescent light from the detected pulse of infrared fluorescent light (the position of reference mark 66). Counting the number of detected pulses of red fluorescent light is realized by an operation that uses the counter described in the first exemplary embodiment.

In this way, control means 1 detects reference mark 66 based on the output waveform of optical detection means 2, identifies the outermost black stripe 60-2 in the horizontal direction by counting the predetermined number of times that the beam spot of excitation light passes red phosphor regions 61, and based on the position information that was identified, determines the display range in the horizontal direction. Control means 1 holds information of the display range that was determined as the stripe boundary position information. Control means 1 then controls the light emission timing of excitation light source 5 based on the stripe boundary position information.

After determining the display range, control means 1 irradiates excitation light within the display range based on the stripe boundary position information in horizontal scanning and adjusts the horizontal amplitude.

The projection-type image display device of the present exemplary embodiment also exhibits the same action and effect as the first exemplary embodiment. In addition, the following effects can also be obtained.

If green fluorescent light and blue fluorescent light or diffused light and reflected light of the excitation light are supplied to optical detection means 2, the noise component increases when detecting red fluorescent light and infrared fluorescent light. In the present exemplary embodiment, noise light of wavelength regions other than red fluorescent light and infrared fluorescent light (including green fluorescent light, blue fluorescent light, and the diffused light and reflected light of excitation light) is absorbed or reflected by wavelength cutoff filter 2a. In this way, the noise component that is contained within the output signal of optical detection means 2 can be reduced.

Because the wavelengths of red fluorescent light and infrared fluorescent light are wavelengths for which the photosensitivity of optical detection means 2 is high, the intensity of the output signal of optical detection means 2 can be increased compared to the first exemplary embodiment.

By reducing the noise component and increasing the signal intensity as described above, the signal-to-noise ratio of the output signal of optical detection means 2 can be improved, whereby the detection precision of reference mark 66 or the detection precision of red phosphor regions 61 is improved. As a result, control for identifying the display range can be carried out with higher precision.

Even when the horizontal scanning speed is not fixed due to the characteristic of scanning means 4, the detection of reference black stripes 60-1, the acquisition of stripe boundary position information, and control can be realized by the same method by taking the scanning speed as a substantially fixed speed in the vicinity of the scanning point.

Fifth Exemplary Embodiment

Figure 19:
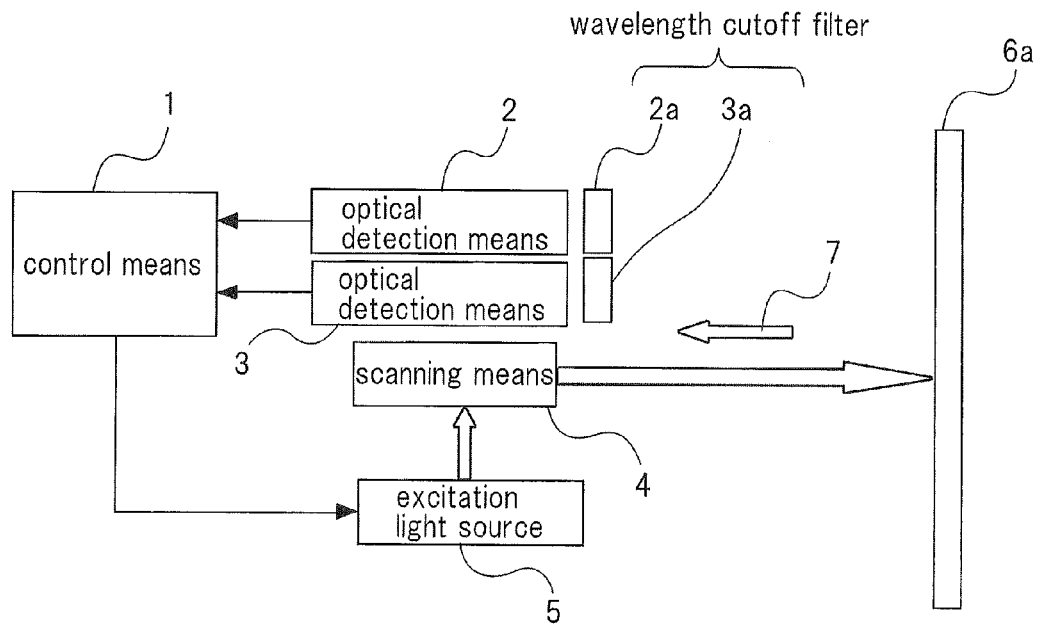
FIG. 19 is a block diagram showing the configuration of the projection-type image display device that is the fifth exemplary embodiment of the present invention.

FIG. 19 is a block diagram showing the configuration of the projection-type image display device that is the fifth exemplary embodiment of the present invention.

The projection-type image display device of the present exemplary embodiment is a device in which optical detection means 3 and wavelength cutoff filter 3a have been added to the device of the fourth exemplary embodiment, and moreover, in which the filter characteristics of wavelength cutoff filter 2a have been modified. The configuration other than optical detection means 3 and wavelength cutoff filters 2a and 3a is the same as the fourth exemplary embodiment.

Wavelength cutoff filter 2a has filter characteristics such that light of the red wavelength band passes through wavelength cutoff filter 2a and other light is absorbed or reflected by wavelength cutoff filter 2a. Wavelength cutoff filter 3a has filter characteristics such that light of the infrared wavelength band passes through wavelength cutoff filter 3a and other light is absorbed or reflected by wavelength cutoff filter 3a.

Optical detection means 2 and 3 are constituted by a silicon PD and have the photosensitivity characteristics such as shown in FIG. 17. Wavelength cutoff filter 2a is provided on the light-receiving surface of optical detection means 2 or at a position that faces the light-receiving surface, and wavelength cutoff filter 3a is provided on the light-receiving surface of optical detection means 3 or at a position that faces the light-receiving surface.

In the present exemplary embodiment, of the red fluorescent light, green fluorescent light, blue fluorescent light, and infrared fluorescent light from fluorescent screen 6a, red fluorescent light passes through wavelength cutoff filter 2a and is then supplied to optical detection means 2. Infrared fluorescent light passes through wavelength cutoff filter 3a and is then supplied to optical detection means 3. The green fluorescent light and blue fluorescent light are absorbed or reflected by wavelength cutoff filters 2a and 3a. The diffused light or reflected light of the excitation light from fluorescent screen 6a is also absorbed or reflected by wavelength cutoff filters 2a and 3a.

Figure 20:
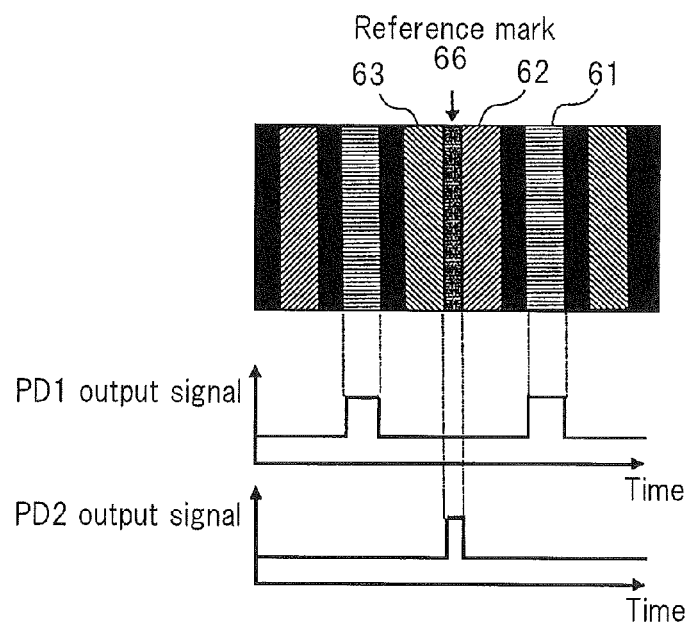
FIG. 20 is a schematic view showing the correspondence relation between the output signal of the optical detection means and the phosphor region and reference pattern when excitation light of a fixed intensity is scanned in the horizontal direction at a fixed scanning speed in the projection-type image display device shown in FIG. 19.

FIG. 20 gives a schematic representation of the correspondence relation between the output signal of optical detection means 2 and 3 and phosphor regions 61, 62, and 63 and reference pattern 66 when excitation light of a fixed intensity is scanned at a fixed scanning speed in a horizontal direction. In FIG. 20, the output signal of PD1 is the output signal of optical detection means 2, and the output signal of PD2 is the output signal of optical detection means 3.

As shown in FIG. 20, the output signal of optical detection means 2 includes the detected pulses of red fluorescent light from phosphor region 61, and the output signal of optical detection means 3 includes the detected pulses of the infrared fluorescent light from reference pattern 66. The pulse width of the detected pulses of infrared fluorescent light is smaller than the pulse width of the detected pulses of red fluorescent light.

Control means 1 refers to the output signal of optical detection means 3 and identifies reference mark 66 based on the timing of the rise of the detected pulses of the infrared fluorescent light.

In addition, the number of detected pulses of the red fluorescent light in one horizontal scanning interval is determined in advance. Accordingly, control means 1 is able to count the number of detected pulses of red fluorescent light in the output signal of optical detection means 2 from the timing of the rise of the detected pulse of the infrared fluorescent light (the position of reference mark 66) and then identify the outermost black stripe 60-2 in the horizontal direction based on the count value. Counting the number of detected pulses of red fluorescent light is realized by an operation that uses the counter described in the first exemplary embodiment.

In this way, control means 1 detects reference mark 66 based on the output waveform of optical detection means 3, and identifies the outermost black stripe 60-2 in the horizontal direction by counting a predetermined number of red phosphor regions 61 over which the beam spot of the excitation light passes based on the output waveform of optical detection means 2. Control means 1 determines the display range in the horizontal direction based on the positional information that was identified and saves the information of the determined display range as the stripe boundary position information. Control means 1 then controls the light emission timing of excitation light source 5 based on the stripe boundary position information.

After determining the display range, control means 1 irradiates excitation light within the display range based on the stripe boundary position information in horizontal scanning and adjusts the horizontal amplitude.

The projection-type image display device of the present exemplary embodiment exhibits the same action and effect as that of the fourth exemplary embodiment.

In addition, because the red fluorescent light from phosphor region 61 and the infrared fluorescent light from reference pattern 66 are separately detected in optical detection means 2 and 3, the process of judging the detected pulses of infrared fluorescent light and detected pulses of red fluorescent light in the fourth exemplary embodiment is unnecessary.

Although two optical detection means are used in the present exemplary embodiment, the present invention is not limited to this form. The light reception surface of one PD may be divided into first and second regions, a wavelength cutoff filter 2a being provided in the first region and wavelength cutoff filter 3a being provided in the second region. In this case, the PD has the function of supplying an electrical signal that depends on the incident light to the first region and supplying an electrical signal that depends on incident light to the second region.

In the fourth and fifth exemplary embodiments, light diffusion regions 63-1 that were described in the third exemplary embodiment may be formed in place of blue phosphor regions 63 of fluorescent screen 6a.

In the fourth and fifth exemplary embodiments, the configuration of the second exemplary embodiment may be applied. In the case of applying the configuration of the second exemplary embodiment, each of reference black stripes 60-1 and horizontal reference lines 65-1 and 65-2 of fluorescent screen 6 are of the same configuration as reference pattern 66.

Still further, in the fourth and fifth exemplary embodiments, the widths of phosphor regions 61, 62, and 63 may be the same, and the width of reference mark 66 may differ from the width of phosphor regions 61, 62, and 63.

In the fourth and fifth exemplary embodiments, reference mark 66 may be formed on a specific phosphor region among phosphor regions 61, 62, and 63. For example, reference mark 66 may be formed on at least one among green phosphor regions 62 or at least one of blue phosphor regions 63. When reference mark 66 is formed on green phosphor region 62 or blue phosphor region 63, the width of reference mark 66 may be the same or may differ from the width of phosphor region 62 or phosphor region 63.

Alternatively, reference mark 66 may be formed by mixing infrared phosphor in at least one of phosphor regions 62 and 63.

Figure 21:
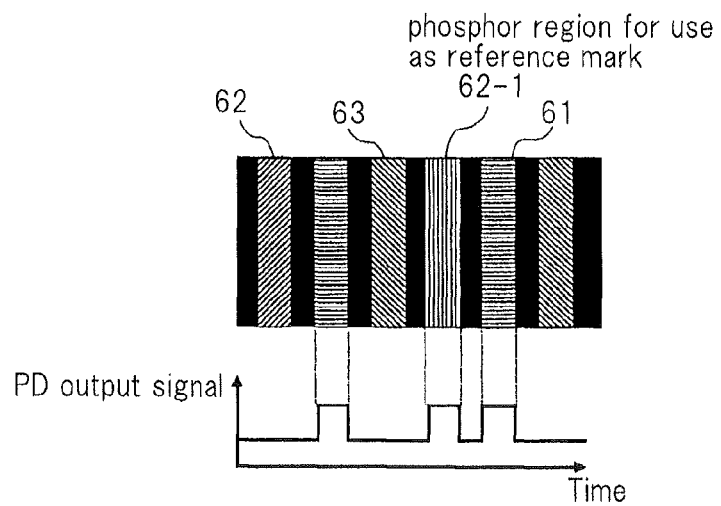
FIG. 21 is a schematic view showing the correspondence relation between the output signal of the optical detection means and the phosphor region and reference pattern when excitation light of a fixed intensity is scanned in the horizontal direction at a fixed scanning speed in a projection-type image display device of another exemplary embodiment of the present invention.

FIG. 21 gives a schematic representation of the correspondence relation between a phosphor region and the output signal of an optical detection means when a fluorescent screen is used in which phosphor region 624 is formed for reference mark use by applying an infrared phosphor to or by mixing an infrared phosphor with a green phosphor region and excitation light of a fixed intensity is scanned at a fixed scanning speed in the horizontal direction.

As shown in FIG. 21, the output signal of the optical detection means includes detected pulses of red fluorescent light from phosphor regions 61 and detected pulses of infrared fluorescent light from phosphor region 62-1 for reference mark use. Because the spacing of the detected pulses of red fluorescent light is fixed, the detected pulses of the red fluorescent light and the detected pulses of the infrared fluorescent light can be distinguished based on the pulse spacing.

Control means 1 refers to the output signals of the optical detection means and identifies phosphor region 62-1 that is used for reference mark based on the timing of the rise of the detected pulses of the infrared fluorescent light.

Figure 22:
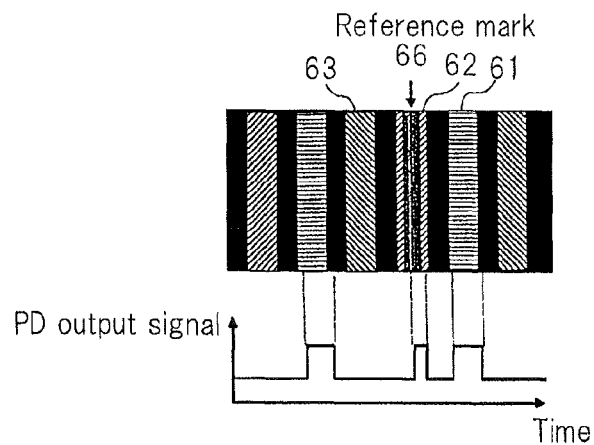
FIG. 22 is a schematic view of the correspondence relation between the output signal of the optical detection means and the phosphor region and reference pattern when excitation light of a fixed intensity is scanned in a horizontal direction at a fixed scanning speed in a projection-type image display device of another exemplary embodiment of the present invention.

FIG. 22 gives a schematic representation of the correspondence relation between phosphor regions and the output signal of the optical detection means when using a fluorescent screen in which reference mark 66 is formed on a green phosphor region and excitation light of a fixed intensity scans at a fixed scanning speed in the horizontal direction.

As shown in FIG. 22, the output signal of the optical detection means includes detected pulses of red fluorescent light from phosphor regions 61 and detected pulses of infrared fluorescent light from reference mark 66. The spacing of detected pulses of red fluorescent light is fixed. In addition, the width of the detected pulses of the red fluorescent light is greater than the width of the detected pulses of the infrared fluorescent light. As a result, the detected pulses of the red fluorescent light can be distinguished from the detected pulses of infrared fluorescent light based on the pulse interval and the pulse width.

Control means 1 refers to the output signal of the optical detection means and identifies reference mark 66 based on the timing of the rise of the detected pulses of the infrared fluorescent light.

Alternatively, in the projection-type image display device of the fourth exemplary embodiment and the fifth exemplary embodiment, a reflection layer may be provided on the scanning surface side of fluorescent screen 6 that reflects blue to green light and in the order of 80% of red light and that transmits the remaining 20% of red light, the excitation light, and the infrared light. In this way, fluorescent light (diffused light) that is directed from the phosphor regions toward the scanning surface side is reflected by the reflection layer toward the side (display surface side) that is opposite the scanning surface side of fluorescent screen 6, whereby higher luminance can be realized. The reflectance of the red light can be determined freely as long as it is within a range that can be detected by the optical detection means. If the reflectance is made high, the screen luminance of red increases, and if the reflectance is made low, the quantity of red light that reaches the optical detection means is increased, whereby detection can be facilitated.

In any of the projection-type image display devices of the first to third exemplary embodiments, a wavelength cutoff filter (similar to wavelength cutoff filter 2a of FIG. 15) may be provided on the light-receiving surface of optical detection means 2 or on a position that faces the light-receiving surface. The wavelength cutoff filter that is used here has filter characteristics such that light of the wavelength band of the excitation light (for example, 360 nm-450 nm) passes through the wavelength cutoff filter and light of other wavelength bands (for example, greater than or equal to 450 nm) is absorbed or reflected by the wavelength cutoff filter. Accordingly, red fluorescent light, green fluorescent light, and blue fluorescent light that are emitted to the screen reverse-surface side are absorbed by the wavelength cutoff filter. Only retroreflected light and diffused light of the excitation light from fluorescent screen 6 pass through the wavelength cutoff filter and are then supplied to optical detection means 2. When red fluorescent light, green fluorescent light, and blue fluorescent light are supplied to optical detection means 2, the noise component increases when detecting the retroreflected light and diffused light of the excitation light, but in the present exemplary embodiment, noise light of wavelength bands other than that of the retroreflected light and diffused light of the excitation light (including the red fluorescent light, green fluorescent light, and blue fluorescent light) is absorbed or reflected by wavelength cutoff filter 2a, whereby the noise component that is contained in the output signal of optical detection means 2 can be reduced. As a result, the detection accuracy of retroreflected light and diffused light of the excitation light can be improved and control for identifying the display range can be carried out with higher precision.

The above-described wavelength cutoff filter may be formed on the scanning surface side (the surface on which black stripes and phosphor stripes are formed) of fluorescent screen 6.

A Multi-projection System A multi-projection system can be constructed using any of the projection-type image display devices of the above-described exemplary embodiments. An example of such a multi-projection system is next described.

A multi-projection display includes a main control unit, an operation unit, and a plurality of projector units and screens. The operation unit includes a plurality of buttons (or operation keys) and supplies instruction signals, according to the input operations that use these buttons, to the main control unit. For example, when the user carries out specific input operations for activating the system, activation signals are supplied from the operation unit to the main control unit.

The main control unit causes each of the projector units to operate in synchronization in accordance with the instruction signals. The main control unit generates video signals to each projector unit based on video signals that are supplied from an external video reproduction device. More specifically, the main control unit divides the images based on the input video signals into images of a plurality of screens according to the number of projector units, and generates divided video signals that correspond to each of the divided images. The main control unit then supplies the divided video signals that were generated to the corresponding projector units.

Each projector unit is constituted by one of the projection-type image display devices of the above-described exemplary embodiments, identifies its own display range, and displays an image based on the input divided video signals in this identified display range.

Figure 23:
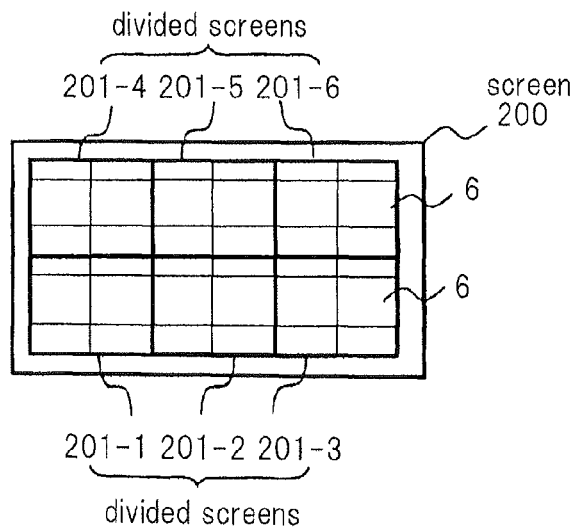
FIG. 23 is a schematic view showing an example of an image that is displayed on a multi-projection system in which the projection-type image display device of the present invention is applied.
Figure 23:
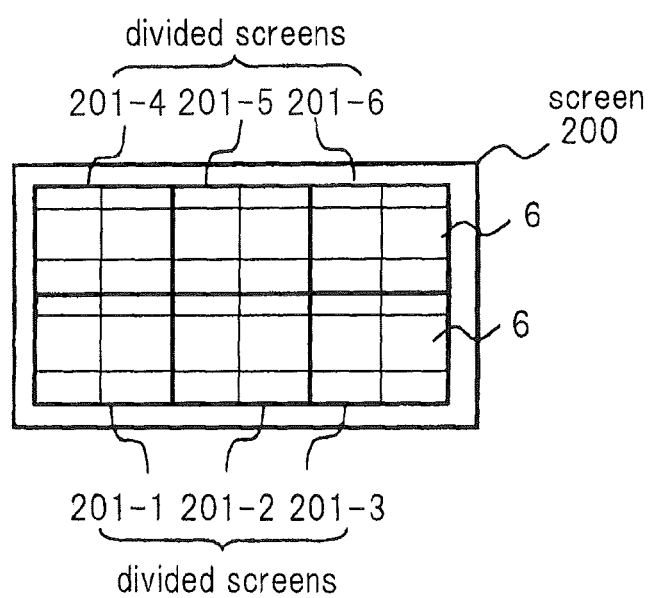

FIG. 23 shows an example of the multiple screens that are displayed by six projector units. In this example, the projector units are configured using the projection-type image display devices of the second exemplary embodiment. Screen 200 is realized by joining together six fluorescent screens 6 having the configuration shown in FIG. 10.

The first projector unit identifies its own display range and displays a divided image based on the input divided video in the identified display range. The display range that was identified by this first projector unit is divided screen 201-1. The second projector unit identifies its own display range and displays a divided image based on the input divided video in the identified display range. The display range that was identified by the second projector unit is divided screen 201-2. The third projector unit identifies its own display range and displays a divided image based on the input divided video in the identified display range. The display range that was identified by the third projector unit is divided screen 201-3.

The fourth projector unit identifies its own display range and displays a divided image based on the input divided video in the identified display range. The display range that was identified by the fourth projector unit is divided screen 201-4. The fifth projector unit identifies its own display range and displays a divided image based on the input divided video in the identified display range. The display range that was identified by the fifth projector unit is divided screen 201-5. The sixth projector unit identifies its own display range and displays a divided image based on the input divided video in the identified display range. The display range that was identified by the sixth projector unit is divided screen 201-6.

Divided screens 201-1-201-6 are in a seamlessly joined state.

Sixth Exemplary Embodiment

The present exemplary embodiment relates to the positions of reference marks in the above-described first to fifth exemplary embodiments.

FIGS. 24-28 show examples of the arrangement of reference marks and the output signals of optical detection means 2 in these arrangements. In FIGS. 24-28, the examples of the arrangement of reference marks are shown schematically and black stripes and phosphor stripes have been omitted.

According to the configuration of the scanning means, the control means in some cases is unable to detect the scanning position and direction from only the input signal (control signal). For example, when the scanning means is a resonant mirror, the phase of resonance scanning is changed by the resonance frequency of the scanning means and the drive frequency that is determined by the control means, and if the amount of this change in phase is great, the scan position and direction cannot be detected from the input signal.

The influence of the change of resonance scanning phase is next described in detail.

Typically, devices that operate by resonance such as a resonant mirror are subject to a fixed phase delay that occurs with respect to input signals. The phase delay of the above-described resonance scanning refers to this phase delay.

Figure 29A:
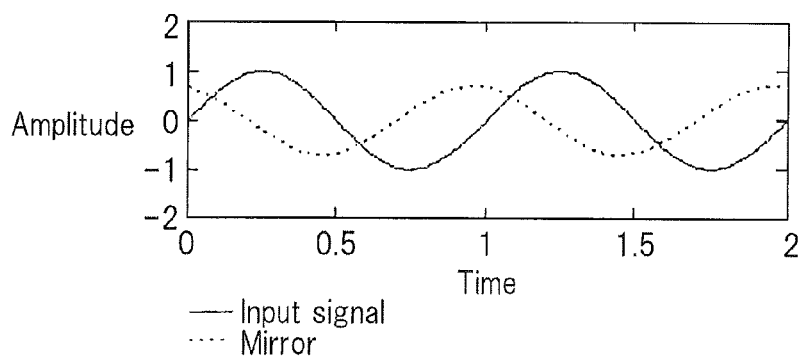
FIG. 29A is an explanatory view for describing the projection-type image display device that is the sixth exemplary embodiment of the present invention.

For example, as shown in FIG. 29A, a resonant mirror is driven by a sine wave with respect to a sine-wave input signal, but the input signal and the resonant mirror operation are not matched in time. This is the above-mentioned phase delay.

This phase delay is influenced by the drive frequency and the mechanical characteristics of a device that operates by resonance. Here, the drive frequency is the frequency of the input signal (control signal) and differs from the resonance frequency. The resonance frequency is a physical parameter (constant) that depends on the device, and the drive frequency is a sine wave frequency (variable) that is produced by the electrical circuit.

Figure 29B:
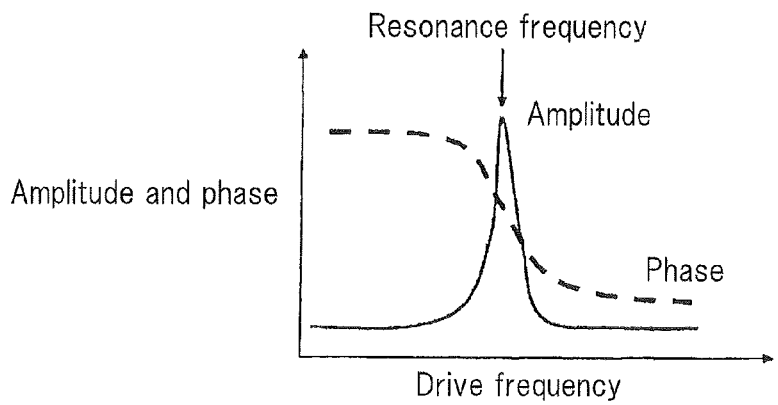
FIG. 29B is an explanatory view for describing the projection-type image display device that is the sixth exemplary embodiment of the present invention.

As shown in FIG. 29B, a resonance device vibrates at the greatest amplitude when operating at the resonance frequency, but even when slightly shifted from the resonance frequency, the device vibrates at relatively large amplitude. On the other hand, a resonance device has the characteristic by which the amount of phase delay changes markedly before and after the resonance frequency.

In a projection-type image display device, control is implemented to change the amplitude or frequency of an input signal (control signal) with respect to change in the mechanical characteristics such that the amplitude of a resonant mirror, which is a resonance device, is kept uniform. If only the amplitude is changed, the phase does not change, but when the frequency is changed to make an adjustment, phase changes and phase delay occurs along with this change. If this phase delay is great, the scanning position and direction cannot be detected from the input signal.

In the present exemplary embodiment, reference marks are arranged such that the scanning direction can be detected from the optical detection signal even in the above-described state in which scanning position and direction cannot be detected from the input signal.

The arrangement of the reference marks is next described in detail.

Figure 24:
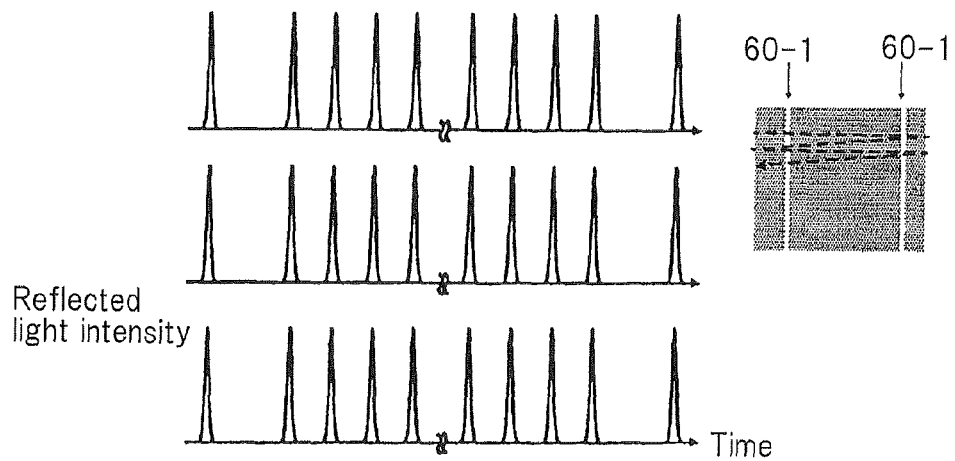
FIG. 24 is an explanatory view for describing the projection-type image display device that is the sixth exemplary embodiment of the present invention.

FIG. 24 shows, as a comparison example, the output signal of optical detection means 2 when first and second reference marks 60-1 are arranged with linear symmetry with respect to a predetermined line (a line located in the screen center) that is perpendicular or approximately perpendicular to the horizontal scanning direction. If the horizontal lines starting in order from the uppermost line are the first, second, and third horizontal lines, the detection signal of the first horizontal line corresponds to the uppermost detection signal in the figure, the detection signal of the second horizontal line corresponds to the detection signal in the middle of the figure, and the detection signal of the third horizontal line corresponds to the lowermost detection signal in the figure. Because the detection signals of the first to third horizontal lines are approximately the same, judging the scanning direction from these detection signals is difficult. In such cases, the scanning direction of the second horizontal line may be mistakenly judged to be the first scanning direction directed from the left edge and towards the right edge and the scanning direction of the first and third horizontal lines may be mistakenly judged to be the second scanning direction that is directed from the right edge and towards the left edge, resulting in an image in which the left and right of the screen are reversed for each horizontal line.

Figure 25:
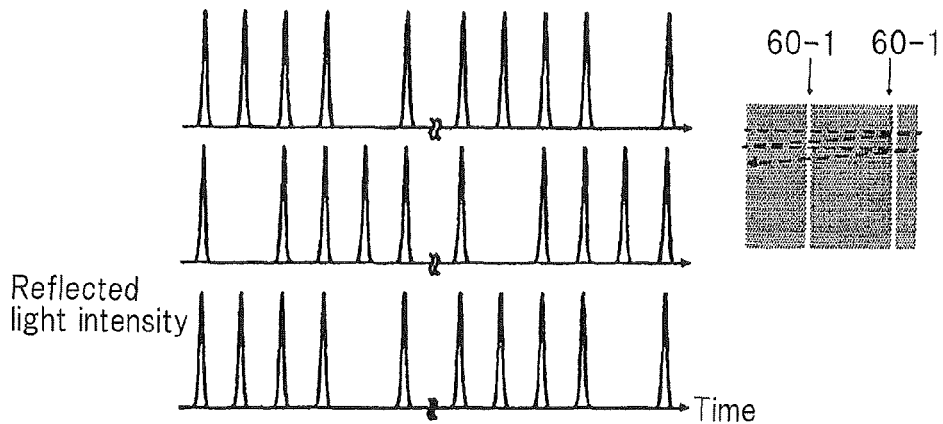
FIG. 25 is an explanatory view for describing the projection-type image display device that is the sixth exemplary embodiment of the present invention.
Figure 26:
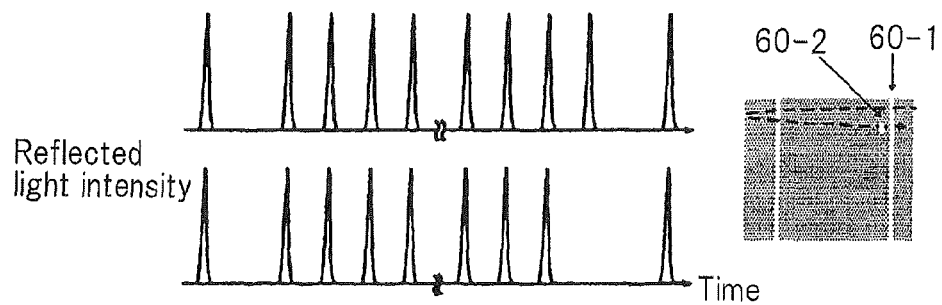
FIG. 26 is an explanatory view for describing the projection-type image display device that is the sixth exemplary embodiment of the present invention.
Figure 27:
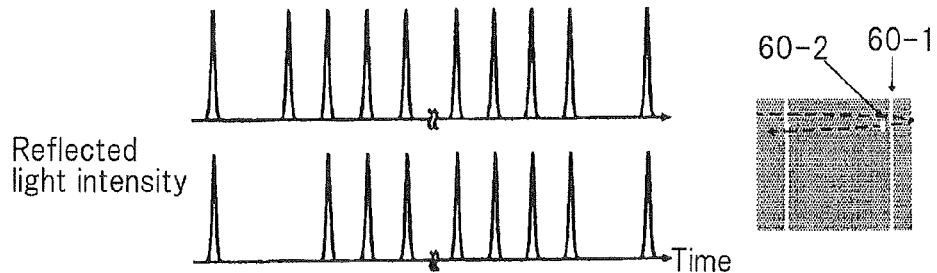
FIG. 27 is an explanatory view for describing the projection-type image display device that is the sixth exemplary embodiment of the present invention.

In the present exemplary embodiment, a plurality of reference marks are arranged so as not to have linear symmetry with respect to a predetermined line (a line located in the screen center) that is perpendicular or approximately perpendicular to the horizontal scanning direction as shown in FIG. 25, FIG. 26, and FIG. 27, whereby the scanning direction based on the output signals of optical detection means 2 can be judged and image reversal can be prevented.

In the example shown in FIG. 25, first and second reference marks 60-1 are arranged to the right and left of the above-mentioned predetermined line, the spacing between first reference mark 60-1 and the left edge of the screen being greater than the spacing between second reference mark 60-1 and the right edge of the screen.

If the horizontal lines starting in order from the uppermost line are the first, second, and third horizontal line, the detection signal of the first horizontal line corresponds to the uppermost detection signal in the figure, the detection signal of the second horizontal line corresponds to the detection signal in the middle of the figure, and the detection signal of the third horizontal line corresponds to the lowermost detection signal in the figure.

The detection signals of the first and third horizontal lines are approximately the same, and the pulse spacing in the portions that correspond to the vicinities of the left and middle of the horizontal line is wide. Detecting these portions in which the pulse spacing is wider enables discernment of the first scanning direction that is directed from the left edge and toward the right edge.

In the detection signal of the second horizontal line, on the other hand, the pulse spacing is wider in portions that correspond to the vicinity of the right end and middle of the horizontal line. Detecting these portions in which the pulse spacing is wider enables discernment of the second scanning direction that is directed from the right edge and towards the left edge.

In the example shown in FIG. 26, first and second reference marks 60-1 are arranged with linear symmetry with respect to the above-described predetermined line, but third reference mark 60-2 is arranged between second reference mark 60-1 and the above-described predetermined line. The length in the perpendicular direction of third reference mark 60-2 is about the width of one horizontal line.

If the horizontal lines starting in order from the uppermost line are the first and second horizontal lines, the detection signal of the first horizontal line corresponds to the upper detection signal in the figure, and the detection signal of the second horizontal line corresponds to the lower detection signal in the figure. In the first horizontal line, the beam spot passes over second reference mark 60-1 and then passes first reference mark 60-1. In the second horizontal line, the beam spot passes over first reference mark 60-1 and then passes third reference mark 60-2 and second reference mark 60-1 in that order.

In the detection signal of the first horizontal line, the pulse spacing widens in the portions that correspond to the vicinity of the left end and the right end, the pulse spacing in these portions being approximately the same. As a result, the scanning direction cannot be discerned based only on the detection signal of the first horizontal line.

On the other hand, in the detection signal of the second horizontal line, the pulse spacing widens in portions that correspond to the vicinities of the left end and the right end, but the pulse spacing in the portion that corresponds to the vicinity of the right end is greater than the pulse spacing that corresponds to the vicinity of the left end. Detecting these portions in which pulse spacing is wider enables discernment of the first scanning direction that is directed from the left end and toward the right end.

If the second scanning direction is known, the scanning direction of other horizontal lines can be known using this horizontal line as a reference.

In the example shown in FIG. 27, first and second reference marks 60-1 and third reference mark 60-2 are arranged as in the example shown in FIG. 6. In the first horizontal line, however, the beam spot passes first reference mark 60-1 and second reference mark 60-1 in that order. In the second horizontal line, the beam spot passes second reference mark 60-1, third reference mark 60-2, and first reference mark 60-1 in that order.

In the case described above, the first horizontal line can be discerned as the second scanning direction that is directed from the right end to the left end based on the detection signal of the first horizontal line.

Figure 28:
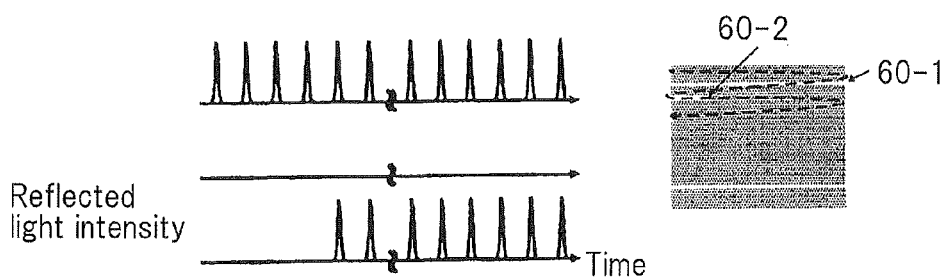
FIG. 28 is an explanatory view for describing the projection-type image display device that is the sixth exemplary embodiment of the present invention.

In the example shown in FIG. 28, first and second reference marks 60-1 and third reference mark 60-2 were used, but these reference marks are all in stripe form extending in the vertical scanning direction. Third reference mark 60-2 is shorter than first and second reference marks 60-1.

First and second reference marks 60-1 are arranged with linear symmetry with respect to a predetermined line (a line located in the screen center) that is parallel to the horizontal scanning direction, but third reference mark 60-2 is arranged between first reference mark 60-1 and the above-described predetermined line.

If horizontal lines starting from the uppermost line are the first, second, and third horizontal lines, the detection signal of the first horizontal line corresponds to the uppermost detection signal in the figure, the detection signal of the second horizontal line corresponds to the detection signal in the middle of the figure, and the detection signal of the third horizontal line corresponds to the lowermost detection signal in the figure.

In the first horizontal line, the beam spot does not pass any of first and second reference marks 60-1 and third reference mark 60-2, and the pulse spacing is therefore uniform in the detection signals.

In the second horizontal line, the beam spot passes first reference mark 60-1 from the right end and toward the left end and does not pass the area of the black stripe, whereby pulses are not produced in the detection signal of the second horizontal line.

In the third horizontal line, the beam spot passes third reference mark 60-2 from the left end and toward the right end, and then passes the area of the black stripe. In the detection signal of the third horizontal line, pulses are not produced in the portion that corresponds to third reference mark 60-2. Detecting this portion in which pulses are not produced enables discernment that the third horizontal line is in the second scanning direction directed from the right end and toward the left end.

If the second scanning direction is known, the scanning direction of the other horizontal lines can be known by using this horizontal line as a reference.

In the example shown in FIG. 28, the third horizontal line directed from the right end and toward the left end is set to pass third reference mark 60-2, but another horizontal line that is directed from the left end and toward the right end may be set to pass third reference mark 60-2. In this case, a portion in which pulses are not produced occurs in the detection signal of the other horizontal line at a position that is the reverse of the detection signal of the third horizontal line shown in FIG. 28. Detecting this portion in which pulses do not occur enables discernment that the other horizontal line is the first scanning direction directed from the left end and toward the right end.

The asymmetrical arrangement shown in FIG. 25 can be applied to an asymmetrical arrangement in the vertical scanning direction. In this case, first and second reference marks 60-2 are both in stripe form extending in the vertical scanning direction, and are arranged with linear symmetry with respect to a predetermined line (a line located in the screen center) that is parallel to the horizontal scanning direction.

To realize the above-described asymmetrical arrangements shown in FIGS. 26-28, the screen should be arranged such that left and right are not positioned equally at the time of assembly. The precision required for this work is low and does not place a burden on the assembly worker.

Seventh Exemplary Embodiment

The present exemplary embodiment relates to the relation between the arrangement of reference marks and projection ranges in the first to sixth exemplary embodiments.

In order to share processing of projector units in a multi-projection system, the pattern of reference marks in the regions (projector regions) in which each projection unit projects is preferably substantially identical. From the standpoint of facilitating screen fabrication, the patterns are also preferably cyclical.

In order to make the patterns of reference marks of each projection region substantially identical, the cycle of repetition of the reference mark patterns (reference mark spacing) is given by: "pattern repetition cycle=projection range length÷positive integer."

Figure 30:
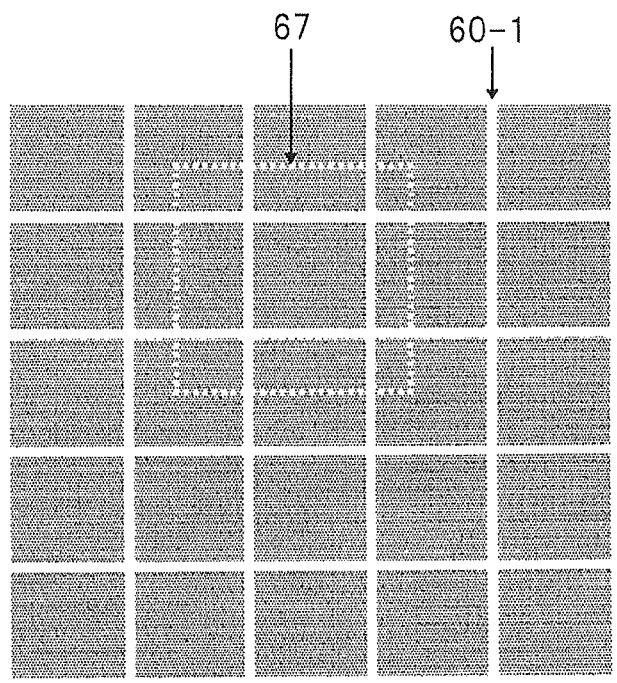
FIG. 30 is an explanatory view for describing the fluorescent screen of the projection-type image display device that is the seventh exemplary embodiment of the present invention.

FIG. 30 shows an example of a reference mark pattern of the projection regions of projection units.

The example shown in FIG. 30 is a case in which "pattern repetition length=projection range length ÷2." In FIG. 30, region 67 that is a rectangular shape indicated by broken lines is the projection region of a projector unit, and a plurality of regions 67 are set adjacent above and below and to the right and left over the entire screen. Each region 67 is the projection region of a projector unit. Over the entire screen, reference marks 60-1 form a grid.

The pattern of reference marks 60-1 of each region 67 is identical. However, in each region 67, reference marks 60-1 are arranged asymmetrically with respect to a predetermined line (a vertical line that is located in the center of region 67) that is perpendicular or approximately perpendicular to the horizontal scanning direction and a predetermined line (a horizontal line located in the center of region 67) that is parallel or approximately parallel to the horizontal scanning direction.

Figure 31:
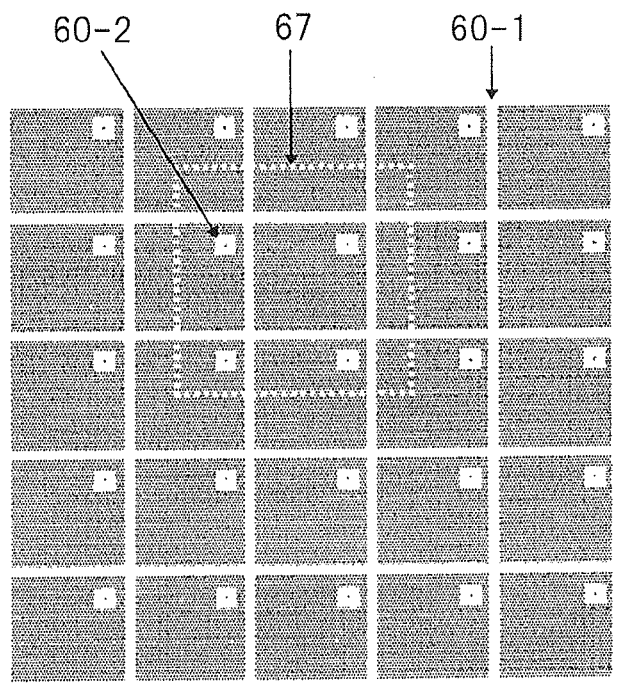
FIG. 31 is an explanatory view for describing the fluorescent screen of the projection-type image display device that is the seventh exemplary embodiment of the present invention.

FIG. 31 shows another example of the pattern of reference marks of regions that are projected by projection units.

The example shown in FIG. 31 is also a case in which "pattern repetition cycle=projection range length ÷2." In FIG. 31, rectangular region 67 that is indicated by broken lines is the projection region of a projector unit, a plurality of regions 67 being set adjacent above and below and to the right and left over the entire screen. Each region 67 is the projection region of a projector unit. Reference marks 60-1 are formed over the entire screen in grid form.

Each region 67 includes reference marks 60-1 and 60-2 and the pattern of reference marks 60-1 and 60-2 of each region 67 is identical. In the square region partitioned by reference marks 60-1, reference mark 60-2 is formed in the vicinity of a corner among the four corners. One reference mark 60-2 is formed in each square region and the position of this reference mark 60-2 is the same in each square region.

A plurality of reference marks 60-2 may be formed in the square region. In this case, however, reference marks 60-2 are arranged asymmetrically in the horizontal scanning direction, in the vertical scanning direction, or in both directions.

By means of the pattern shown in FIG. 31, at least two reference marks can be detected for the scanning direction regardless of the position at which regions 67 are set at the time of fabrication, whereby the work burden on the fabricator can be further reduced.

Figure 32:
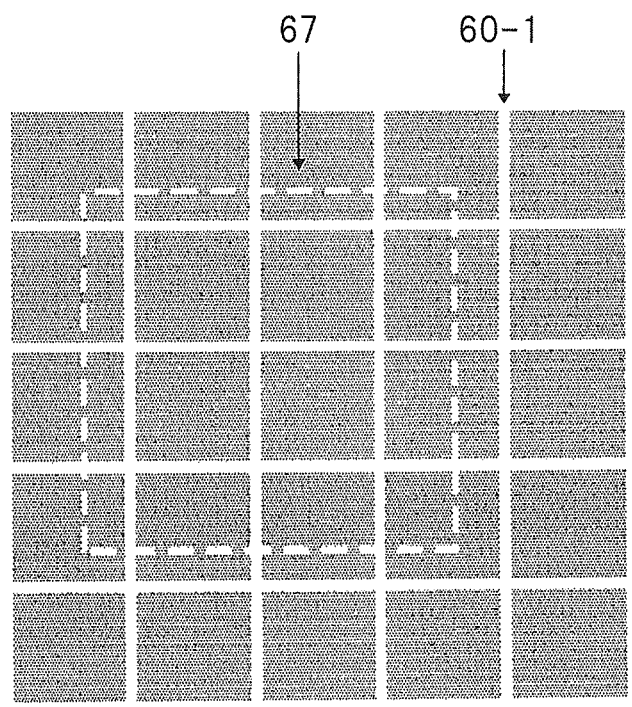
FIG. 32 is an explanatory view for describing the fluorescent screen of the projection-type image display device that is the seventh exemplary embodiment of the present invention.

FIG. 32 shows another example of the pattern of reference marks of regions that are projected by projection units The example shown in FIG. 32 is a case in which "pattern repetition cycle=projection range length ÷3."

In FIG. 32, rectangular region 67 indicated by the broken lines is the projection region of a projector unit, and a plurality of regions 67 are set adjacent above and below and to the right and left over the entire screen. Each region 67 is the projection region of a projector unit. Reference marks 60-1 are formed over the entire screen in a grid form.

The pattern of reference marks 60-1 of each region 67 is the same. However, reference marks 60-1 are arranged asymmetrically with respect to predetermined lines (vertical lines located in the centers of regions 67) that are perpendicular or approximately perpendicular to the horizontal scanning direction and predetermined lines (horizontal lines located in the centers of regions 67) that are parallel or approximately parallel to the horizontal scanning direction.

In the examples of the arrangement shown in FIGS. 30 and 32, reference marks 60-2 as shown in FIG. 31 may be added so as to be asymmetrical in the left-right direction as described in the sixth exemplary embodiment.

The reference marks are not limited to the linear form shown in the figures. The reference marks may be in the form of broken lines. Alternatively, the reference marks may also be in the form of curved lines. Still further, the reference marks may be formed in a plurality of stripes. The reference marks may also be shapes other than lines (for example, circles or rectangles).

Although the present invention has been described with reference to exemplary embodiments, the present invention is not limited to the exemplary embodiments described hereinabove. The configuration and operation of the present invention are open to various modifications within a scope that does not depart from the gist of the present invention that will be clear to one of ordinary skill in the art.

This application claims the benefits of priority based on Japanese Patent Application No. 2011-046727 for which application was submitted on Mar. 3, 2011 and Japanese Patent Application No. 2011-211615 for which application was submitted on Sep. 27, 2011, and incorporates by citation all of the disclosures of these applications.

What is claimed is:

1. A projection screen comprising:
a plurality of diffusion regions that are arranged cyclically in an in-plane direction of a display region and that each receive light and emit diffused light;
an optical information formation unit that is provided at a specific position within said display region and that forms readable optical information; and
a plurality of black stripes that partition said display region into said plurality of diffusion regions, wherein:
said plurality of black stripes include at least one reference black stripe that is a reference for detecting said specific position; and
said optical information formation unit includes a plurality of reflection regions that are formed on each black stripe other than said reference black stripe and that reflect light.

2. The projection screen as set forth in claim 1, further comprising a plurality of reference scanning lines that are orthogonal to each of said plurality of black stripes; wherein said plurality of reflection regions are formed in regions other than said plurality of reference scanning lines on each black stripe other than said reference black stripe.

3. The projection screen as set forth in claim 1, wherein said optical information formation unit further includes a quarter-wave layer that is formed on said reference black stripe.

4. The projection screen as set forth in claim 1, wherein said optical information formation unit further includes a wavelength-selecting layer that is formed on said reference black stripe, that reflects light of a specific wavelength or attenuates light of the specific wavelength and that reflects light of wavelengths other than the specific wavelength.

5. The projection screen as set forth in claim 1, wherein said optical information formation unit further includes a phosphor region that is formed on said reference black stripe and that is excited by light and emits fluorescent light of a predetermined wavelength.

6. The projection screen as set forth in claim 1, wherein said optical information formation unit generates an optical pattern that indicates a range of said display region.

7. The projection screen as set forth in claim 1, wherein said plurality of diffusion regions comprise:
a first phosphor region in which a phosphor whose fluorescent color is red is formed;
a second phosphor region in which a phosphor whose fluorescent color is green is formed; and
a third phosphor region in which a phosphor whose fluorescent color is blue is formed;
wherein said first to third phosphor regions are arranged cyclically in a predetermined order.

8. The projection screen as set forth in claim 7, further comprising a filter on a surface on which said plurality of diffusion regions are formed, said filter being provided with characteristics in which excitation light of a wavelength band that excites each of said phosphors passes through said filter and light of other wavelength bands is absorbed or reflected by said filter.

9. The projection screen as set forth in claim 7, further comprising a wavelength-selecting reflection layer on a surface on which said plurality of diffusion regions are formed, wherein said wavelength-selecting reflection layer transmits excitation light that excites each of said phosphors and reflects visible light.

10. The projection screen as set forth in claim 1, wherein said plurality of diffusion regions comprise:
a first phosphor region in which a phosphor whose fluorescent color is red is formed;
a second phosphor region in which a phosphor whose fluorescent color is green is formed; and
a light diffusion region that diffuses light;
wherein said first and second phosphor regions and said light diffusion region are arranged cyclically in a predetermined order.

11. The projection screen as set forth in claim 10, further comprising a filter on a surface on which said plurality of diffusion regions are formed, said filter being provided with characteristics in which excitation light of a wavelength band that excites each of said phosphors passes through said filter and light of other wavelength bands is absorbed or reflected by said filter.

12. The projection screen as set forth in claim 10, further comprising a wavelength-selecting reflection layer on a surface on which said plurality of diffusion regions are formed, wherein said wavelength-selecting reflection layer transmits excitation light that excites each of said phosphors and reflects visible light.

13. A projection screen comprising:
- a plurality of diffusion regions that are arranged cyclically in an in-plane direction of a display region and that each receive light and emit diffused light;
- an optical information formation unit that is provided at a specific position within said display region and that forms readable optical information; and
- a plurality of black stripes that partition said display region into said plurality of diffusion regions, wherein:
- said plurality of black stripes include at least one reference black stripe that serves as a reference for detecting said specific position,
- said optical information formation unit includes:
  - a plurality of first reflection regions that are formed on each black stripe other than said reference black stripe and that reflect light; and
  - a second reflection region that is formed on said reference black stripe and that reflects light, and
- a width of each of said first reflection regions differs from a width of said second reflection region.

14. A projection screen comprising:
- a plurality of diffusion regions that are arranged cyclically in an in-plane direction of a display region and that each receive light and emit diffused light;
- an optical info u nation formation unit that is provided at a specific position within said display region and that forms readable optical information; and
- a plurality of black stripes that partition said display region into said plurality of diffusion regions, wherein:
- said plurality of black stripes include at least one reference black stripe that serves as a reference for detecting said specific position,
- said optical information formation unit includes:
  - a plurality of first reflection regions that are formed on each black stripe other than said reference black stripe and that reflect light; and
  - a second reflection region that is formed on said reference black stripe and that reflects light, and
- said second reflection region forms a specific reflection pattern.

15. A projection screen comprising:
- a plurality of diffusion regions that are arranged cyclically in an in-plane direction of a display region and that each receive light and emit diffused light; and
- an optical information formation unit that is provided at a specific position within said display region and that forms readable optical information,
- wherein said optical information formation unit includes a phosphor region that is provided on a specific diffusion region from among said plurality of diffusion regions and that is excited by light to emit fluorescent light of a predetermined wavelength.

16. The projection screen as set forth in claim 15, wherein a width of said phosphor region in a direction that is orthogonal to a longitudinal direction of said specific diffusion region matches a width of said specific diffusion region.

17. The projection screen as set forth in claim 15, wherein a width of said phosphor region in the direction orthogonal to a longitudinal direction of said specific diffusion region differs from a width of said specific diffusion region.

18. The projection screen as set forth in claim 15, wherein said phosphor region includes a phosphor that emits infrared fluorescent light.

19. A projection screen comprising:
- a plurality of diffusion regions that are arranged cyclically in an in-plane direction of a display region and that each receive light and emit diffused light;
- an optical information formation unit that is provided at a specific position within said display region and that forms readable optical information; and
- a plurality of black stripes that partition said display region into said plurality of diffusion regions, wherein:
- said plurality of black stripes include at least one reference black stripe that serves as a reference for detecting said specific position, and
- said optical information formation unit includes a phosphor region that is formed on said reference black stripe and that is excited by light to emit fluorescent light of a predetermined wavelength.

20. The projection screen as set forth in claim 19, wherein said phosphor region includes a phosphor that emits infrared fluorescent light.

21. A projection-type image display device comprising:
- a projection screen;
- an excitation light source;
- a scanning unit that scans said projection screen with an optical beam from said excitation light source;
- an optical detection unit that is arranged to face a surface of said projection screen on which said scanning is carried out; and
- a control unit that both controls said scanning unit and controls the light emission timing of said excitation light source to cause display of images on said projection screen, wherein:
- said projection screen includes:
  - a plurality of diffusion regions that are arranged cyclically in an in-plane direction of the display region and that each receive light and emit diffused light; and
  - an optical information formation unit that is provided at a specific position within said display region and that forms readable optical information;
  - said optical detection unit supplies signals that accord with a pattern of light that is formed by said optical information formation unit when said projection screen is being scanned by said optical beam; and
  - said control unit acquires said specific position on said projection screen based on output signals of said optical detection unit, identifies said display region on said projection screen based on the specific position that was acquired, and causes display of said images in the identified display region,
- wherein said projection screen further comprises a plurality of black stripes that partition said display region into said plurality of diffusion regions,
- wherein said plurality of black stripes include at least one reference black stripe that is a reference for detecting said specific position, and
- wherein said optical information formation unit includes a plurality of reflection regions that are formed on each black stripe other than said reference black stripe and that reflect said optical beam toward said optical detection unit.

22. The projection-type image display device as set forth in claim 21, wherein:
said projection screen further includes a plurality of reference scanning lines that are orthogonal to each of said plurality of black stripes; and said plurality of reflection regions are formed in regions other than said plurality of reference scanning lines on each black stripe other than said reference black stripe.

23. The projection-type image display device as set forth in claim 21, wherein said optical information formation unit further includes a quarter-wave layer that is formed on said reference black stripe.

24. The projection-type image display device as set forth in claim 21, wherein said optical information formation unit further includes a wavelength-selecting layer that is formed on said reference black stripe, that reflects light of a specific wavelength or attenuates light of the specific wavelength and that reflects light of wavelengths other than the specific wavelength.

25. The projection-type image display device as set forth in claim 21, wherein:

said optical information formation unit further includes a phosphor region that is formed on said reference black stripe and that is excited by said optical beam to emit fluorescent light of a predetermined wavelength; and said projection-type image display device further includes a filter that is provided on a light-receiving surface of said optical detection unit or at a position that faces the light-receiving surface and that transmits said fluorescent light and reflects or absorbs light other than the fluorescent light.

26. The projection-type image display device as set forth in claim 21, wherein said optical information formation unit generates a light pattern that indicates a range of said display region.

27. A multi-projection system comprising:

a plurality of projector units, each unit being made up of the projection-type image display device as set forth in claim 21; and a main control unit that causes each of said plurality of projector units to display images based on input video signals.

28. A projection-type image display device comprising:
projection screen;
an excitation light source;
a scanning unit that scans said projection screen with an optical beam from said excitation light source;
an optical detection unit that is arranged to face a surface of said projection screen on which said scanning is carried out; and
a control unit that both controls said scanning unit and controls the light emission timing of said excitation light source to cause display of images on said projection screen, wherein:
said projection screen includes:
a plurality of diffusion regions that are arranged cyclically in an in-plane direction of the display region and that each receive light and emit diffused light; and
an optical information formation unit that is provided at a specific position within said display region and that forms readable optical information;
said optical detection unit supplies signals that accord with a pattern of light that is formed by said optical information formation unit when said projection screen is being scanned by said optical beam; and
said control unit acquires said specific position on said projection screen based on output signals of said optical detection unit, identifies said display region on said projection screen based on the specific position that was acquired, and causes display of said images in the identified display region,
wherein said projection screen further includes a plurality of black stripes that partition said display region into said plurality of diffusion regions,
wherein said plurality of black stripes include at least one reference black stripe that serves as a reference for detecting said specific position,
wherein said optical information formation unit includes:
a plurality of first reflection regions that are formed on each black stripe other than said reference black stripe and that reflect said optical beam toward said optical detection unit; and
a second reflection region that is formed on said reference black stripe and that reflects said optical beam toward said optical detection unit, and
wherein a width of each of said first reflection regions differs from a width of said second reflection region.

29. A projection-type image display device comprising:
a projection screen;
an excitation light source;
a scanning unit that scans said projection screen with an optical beam from said excitation light source;
an optical detection unit that is arranged to face a surface of said projection screen on which said scanning is carried out; and
a control unit that both controls said scanning unit and controls the light emission timing of said excitation light source to cause display of images on said projection screen, wherein:
said projection screen includes:
a plurality of diffusion regions that are arranged cyclically in an in-plane direction of the display region and that each receive light and emit diffused light; and
an optical information formation unit that is provided at a specific position within said display region and that forms readable optical information;
said optical detection unit supplies signals that accord with a pattern of light that is formed by said optical information formation unit when said projection screen is being scanned by said optical beam; and
said control unit acquires said specific position on said projection screen based on output signals of said optical detection unit, identifies said display region on said projection screen based on the specific position that was acquired, and causes display of said images in the identified display region,
wherein said projection screen further includes a plurality of black stripes that partition said display region into said plurality of diffusion regions,
wherein said plurality of black stripes include at least one reference black stripe that serves as a reference for detecting said specific position,
wherein said optical information formation unit includes:
a plurality of first reflection regions that are formed on each black stripe other than said reference black stripe and that reflect said optical beam toward said optical detection unit; and
a second reflection region that is formed on said reference black stripe and that reflects said optical beam toward said optical detection unit, and
wherein said second reflection region forms a specific reflection pattern.

30. A projection-type image display device comprising:
a projection screen;
an excitation light source;

a scanning unit that scans said projection screen with an optical beam from said excitation light source;

an optical detection unit that is arranged to face a surface of said projection screen on which said scanning is carried out; and a control unit that both controls said scanning unit and controls the light emission timing of said excitation light source to cause display of images on said projection screen, wherein:

said projection screen includes:
a plurality of diffusion regions that are arranged cyclically in an in-plane direction of the display region and that each receive light and emit diffused light; and
an optical information formation unit that is provided at a specific position within said display region and that forms readable optical information;

said optical detection unit supplies signals that accord with a pattern of light that is formed by said optical information formation unit when said projection screen is being scanned by said optical beam; and said control unit acquires said specific position on said projection screen based on output signals of said optical detection unit, identifies said display region on said projection screen based on the specific position that was acquired, and causes display of said images in the identified display region, and wherein said optical information formation unit includes a phosphor region that is provided on a specific diffusion region among said plurality of diffusion regions and that is excited by said optical beam to emit fluorescent light of a predetermined wavelength.

31. The projection-type image display device as set forth in claim 30, wherein a width of said phosphor region in a direction that is orthogonal to a longitudinal direction of said specific diffusion region matches a width of said specific diffusion region.

32. The projection-type image display device as set forth in claim 30, wherein a width of said phosphor region in a direction that is orthogonal to a longitudinal direction of said specific diffusion region differs from a width of said specific diffusion region.

33. The projection-type image display device as set forth in claim 30, wherein said plurality of diffusion regions include:
a first phosphor region in which a phosphor whose fluorescent color is red is formed;
a second phosphor region in which a phosphor whose fluorescent color is green is formed; and
a third phosphor region in which a phosphor whose fluorescent color is blue is formed; wherein:
said first to third phosphor regions are arranged in a predetermined order, and
fluorescent light of said predetermined wavelength is infrared fluorescent light.

34. The projection-type image display device as set forth in claim 33, further comprising a filter that is provided with characteristics in which said red and infrared wavelength bands pass through said filter and light of other wavelength bands is absorbed or reflected by said filter.

35. The projection-type image display device as set forth in claim 34, further comprising a wavelength-selecting reflection layer on a scanning surface side of said projection screen, wherein said wavelength-selecting reflection layer transmits a portion of excitation light, infrared light, and red light and reflects visible light.

36. The projection-type image display device as set forth in claim 33, wherein:

said optical detection unit includes first and second photodiodes; and said projection-type image display device further includes:
a first filter that is provided on a light-receiving surface of said first photodiode or at a position that faces the light-receiving surface and that is provided with characteristics in which light of said red wavelength band passes through said first filter and light of other wavelength bands is absorbed or reflected by said first filter; and
a second filter that is provided on a light-receiving surface of said second photodiode or at a position that faces the light-receiving surface and that is provided with characteristics in which light of said infrared wavelength band passes through said second filter and light of other wavelength bands is absorbed or reflected by said second filter.

37. The projection-type image display device as set forth in claim 36, further comprising a wavelength-selecting reflection layer on a scanning surface side of said projection screen, wherein said wavelength-selecting reflection layer transmits a portion of excitation light, infrared light, and red light and reflects visible light.

38. The projection-type image display device as set forth in claim 30, wherein said plurality of diffusion regions include:
a first phosphor region in which a phosphor whose fluorescent color is red is formed;
a second phosphor region in which a phosphor whose fluorescent color is green is formed; and
a light diffusion region that diffuses light; wherein:
said first and second phosphor regions and said light diffusion region are arranged in a predetermined order, and
fluorescent light of said predetermined wavelength is infrared fluorescent light.

39. The projection-type image display device as set forth in claim 38, further comprising a filter that is provided with characteristics in which said red and infrared wavelength bands pass through said filter and light of other wavelength bands is absorbed or reflected by said filter.

40. The projection-type image display device as set forth in claim 39, further comprising a wavelength-selecting reflection layer on a scanning surface side of said projection screen, wherein said wavelength-selecting reflection layer transmits a portion of excitation light, infrared light, and red light and reflects visible light.

41. The projection-type image display device as set forth in claim 38, wherein:

said optical detection unit includes first and second photodiodes; and said projection-type image display device further includes:
a first filter that is provided on a light-receiving surface of said first photodiode or at a position that faces the light-receiving surface and that is provided with characteristics in which light of said red wavelength band passes through said first filter and light of other wavelength bands is absorbed or reflected by said first filter; and
a second filter that is provided on a light-receiving surface of said second photodiode or at a position that faces the light-receiving surface and that is provided with characteristics in which light of said infrared wavelength band passes through said second filter and light of other wavelength bands is absorbed or reflected by said second filter.

42. The projection-type image display device as set forth in claim 41, further comprising a wavelength-selecting reflection layer on a scanning surface side of said projection screen, wherein said wavelength-selecting reflection layer transmits a portion of excitation light, infrared light, and red light and reflects visible light.

43. A projection-type image display device comprising:
   a projection screen;
   an excitation light source;
   a scanning unit that scans said projection screen with an optical beam from said excitation light source;
   an optical detection unit that is arranged to face a surface of said projection screen on which said scanning is carried out; and
   a control unit that both controls said scanning unit and controls the light emission timing of said excitation light source to cause display of images on said projection screen, wherein:
   said projection screen includes:
      a plurality of diffusion regions that are arranged cyclically in an in-plane direction of the display region and that each receive light and emit diffused light; and
      an optical information formation unit that is provided at a specific position within said display region and that forms readable optical information;
      said optical detection unit supplies signals that accord with a pattern of light that is fowled by said optical information formation unit when said projection screen is being scanned by said optical beam; and
      said control unit acquires said specific position on said projection screen based on output signals of said optical detection unit, identifies said display region on said projection screen based on the specific position that was acquired, and causes display of said images in the identified display region,
   wherein said projection screen further includes a plurality of black stripes that partition said display region into said plurality of diffusion regions,
   wherein said plurality of black stripes include at least one reference black stripe that serves as a reference for detecting said specific position, and
   wherein said optical information formation unit includes a phosphor region that is formed on said reference black stripe and that is excited by said optical beam to emit fluorescent light of a predetermined wavelength.

44. The projection-type image display device as set forth in claim 43, wherein said plurality of diffusion regions include:
   a first phosphor region in which a phosphor whose fluorescent color is red is formed;
   a second phosphor region in which a phosphor whose fluorescent color is green is formed; and
   a third phosphor region in which a phosphor whose fluorescent color is blue is formed; wherein:
   said first to third phosphor regions are arranged in a predetermined order, and
   fluorescent light of said predetermined wavelength is infrared fluorescent light.

45. The projection-type image display device as set forth in claim 44, further comprising a filter that is provided with characteristics in which said red and infrared wavelength bands pass through said filter and light of other wavelength bands is absorbed or reflected by said filter.

46. The projection-type image display device as set forth in claim 45, further comprising a wavelength-selecting reflection layer on a scanning surface side of said projection screen, wherein said wavelength-selecting reflection layer transmits a portion of excitation light, infrared light, and red light and reflects visible light.

47. The projection-type image display device as set forth in claim 44, wherein:
   said optical detection unit includes first and second photodiodes; and
   said projection-type image display device further includes:
      a first filter that is provided on a light-receiving surface of said first photodiode or at a position that faces the light-receiving surface and that is provided with characteristics in which light of said red wavelength band passes through said first filter and light of other wavelength bands is absorbed or reflected by said first filter; and
      a second filter that is provided on a light-receiving surface of said second photodiode or at a position that faces the light-receiving surface and that is provided with characteristics in which light of said infrared wavelength band passes through said second filter and light of other wavelength bands is absorbed or reflected by said second filter.

48. The projection-type image display device as set forth in claim 47, further comprising a wavelength-selecting reflection layer on a scanning surface side of said projection screen, wherein said wavelength-selecting reflection layer transmits a portion of excitation light, infrared light, and red light and reflects visible light.

49. The projection-type image display device as set forth in claim 43, wherein said plurality of diffusion regions include:
   a first phosphor region in which a phosphor whose fluorescent color is red is formed;
   a second phosphor region in which a phosphor whose fluorescent color is green is formed; and
   a light diffusion region that diffuses light; wherein:
   said first and second phosphor regions and said light diffusion region are arranged in a predetermined order, and
   fluorescent light of said predetermined wavelength is infrared fluorescent light.

50. The projection-type image display device as set forth in claim 49, further comprising a filter that is provided with characteristics in which said red and infrared wavelength bands pass through said filter and light of other wavelength bands is absorbed or reflected by said filter.

51. The projection-type image display device as set forth in claim 50, further comprising a wavelength-selecting reflection layer on a scanning surface side of said projection screen, wherein said wavelength-selecting reflection layer transmits a portion of excitation light, infrared light, and red light and reflects visible light.

52. The projection-type image display device as set forth in claim 49, wherein:
   said optical detection unit includes first and second photodiodes; and
   said projection-type image display device further includes:
      a first filter that is provided on a light-receiving surface of said first photodiode or at a position that faces the light-receiving surface and that is provided with characteristics in which light of said red wavelength band passes through said first filter and light of other wavelength bands is absorbed or reflected by said first filter; and
      a second filter that is provided on a light-receiving surface of said second photodiode or at a position that faces the light-receiving surface and that is provided with characteristics in which light of said infrared wavelength band passes through said second filter and light of other wavelength bands is absorbed or reflected by said second filter.

53. The projection-type image display device as set forth in claim 52, further comprising a wavelength-selecting reflection layer on a scanning surface side of said projection screen, wherein said wavelength-selecting reflection layer transmits a portion of excitation light, infrared light, and red light and reflects visible light.

54. A projection-type image display device comprising:
    a projection screen;
    an excitation light source;
    a scanning unit that scans said projection screen with an optical beam from said excitation light source;
    an optical detection unit that is arranged to face a surface of said projection screen on which said scanning is carried out; and
    a control unit that both controls said scanning unit and controls the light emission timing of said excitation light source to cause display of images on said projection screen, wherein:
    said projection screen includes:
        a plurality of diffusion regions that are arranged cyclically n an in-plane direction of the display region and that each receive light and emit diffused light; and
        an optical information formation unit that is provided at a specific position within said display region and that forms readable optical information;
        said optical detection unit supplies signals that accord with a pattern of light that is formed by said optical information formation unit when said projection screen is being scanned by said optical beam; and
        said control unit acquires said specific position on said projection screen based on output signals of said optical detection unit, identifies said display region on said projection screen based on the specific position that was acquired, and causes display of said images in the identified display region,
    wherein said projection screen includes, in said display region, a plurality of black stripes and a plurality of reference black stripes that serve as reference for detecting said specific position,
    wherein said optical information formation unit includes a plurality of reflection regions that are formed on each black stripe other than said reference black stripes and that reflect said optical beam toward said optical detection unit, and
    wherein said plurality of reference black stripes are arranged asymmetrically within the scanning range of said scanning unit.

55. The projection-type image display device as set forth in claim 54, wherein said plurality of reference black stripes are arranged cyclically, the spacing of the reference black stripes being a value obtained by dividing a length of said display region in the scanning direction by a positive integer.

56. The projection-type image display device as set forth in claim 55, wherein said plurality of reference black stripes are arranged cyclically, the spacing of said reference black stripes being one-third the length of said display region in the scanning direction.

57. The projection-type image display device as set forth in claim 55, wherein the repeating pattern of the reference black stripes is an asymmetrical pattern.

* * * * *